United States Patent
Bugeja

(10) Patent No.: US 10,292,373 B2
(45) Date of Patent: May 21, 2019

(54) WASTE-MOVEMENT SYSTEM FOR AQUARIUM

(71) Applicant: Anthony Bugeja, Oak Ridges (CA)

(72) Inventor: Anthony Bugeja, Oak Ridges (CA)

( * ) Notice: Subject to any disclaimer, the term of this patent is extended or adjusted under 35 U.S.C. 154(b) by 448 days.

(21) Appl. No.: 15/336,943

(22) Filed: Oct. 28, 2016

(65) Prior Publication Data

US 2018/0116186 A1    May 3, 2018

(51) Int. Cl.
| | |
|---|---|
| *A01K 63/00* | (2017.01) |
| *A01K 63/04* | (2006.01) |
| *B01D 24/30* | (2006.01) |
| *C02F 1/00* | (2006.01) |
| *C02F 103/20* | (2006.01) |

(52) U.S. Cl.
CPC .......... *A01K 63/045* (2013.01); *A01K 63/006* (2013.01); *A01K 63/047* (2013.01); *B01D 24/305* (2013.01); *C02F 1/00* (2013.01); *B01D 2101/04* (2013.01); *B01D 2201/0415* (2013.01); *B01D 2201/14* (2013.01); *B01D 2201/28* (2013.01); *C02F 2103/20* (2013.01)

(58) Field of Classification Search
CPC ..... A01K 63/00; A01K 63/003; A01K 63/045
USPC ................. 119/245, 259, 264, 269
See application file for complete search history.

(56) References Cited

U.S. PATENT DOCUMENTS

| | | |
|---|---|---|
| D293,706 S | 1/1988 | Ng |
| 4,725,353 A | 2/1988 | Whitman |
| 4,957,623 A | 9/1990 | Henzlik |
| 5,199,378 A * | 4/1993 | Kissick, Jr. .......... A01K 63/045 119/232 |
| 5,234,581 A * | 8/1993 | Rosenberg ........... A01K 63/045 119/260 |
| 5,536,398 A * | 7/1996 | Reinke ................. A01K 63/045 119/260 |
| 5,667,672 A | 9/1997 | Convertino et al. |
| 6,007,713 A | 12/1999 | Michalik |
| 7,029,577 B2 * | 4/2006 | Cummins .............. A01K 63/04 210/167.31 |
| 7,081,198 B2 * | 7/2006 | Weng .................. A01K 63/003 210/167.26 |
| 7,149,571 B2 * | 12/2006 | Maeda .................. A61B 5/044 600/523 |
| 7,430,989 B2 * | 10/2008 | Allis .................... A01K 63/042 119/259 |

(Continued)

FOREIGN PATENT DOCUMENTS

| | | |
|---|---|---|
| CN | 204294488 | 4/2015 |
| DE | 102012104438 | 7/2013 |

*Primary Examiner* — Richard T Price, Jr.

(57) ABSTRACT

An apparatus includes a waste-movement system having a bed-support assembly configured to receive, contain and support an aquarium bed of an aquarium. A vibration-source assembly is configured to be positioned relative to the bed-support assembly. The vibration-source assembly is also configured to selectively generate and transmit vibrational energy to the aquarium bed while the aquarium water is made to flow. This is done in such a way that the gravel of the aquarium bed becomes, at least in part, spaced apart (at least in part) from one another; and the aquarium water, at least in part, moves (at least in part) the liquefied waste and the solid waste through the aquarium bed from a first interior section to a second interior section of the aquarium.

19 Claims, 15 Drawing Sheets

(56) References Cited

U.S. PATENT DOCUMENTS 8,033,252 B2 * 10/2011 Allis .................... A01K 63/042
  119/261
8,485,132 B2 * 7/2013 Kong .................... A01K 63/04
  119/223

* cited by examiner

WASTE-MOVEMENT SYSTEM FOR AQUARIUM

TECHNICAL FIELD

This document relates to the technical field of (and is not limited to) a waste-movement system for use with an aquarium, or an aquarium including a waste-movement system (and method therefor).

BACKGROUND

An aquarium (plural: aquariums or aquaria) is a vivarium (an enclosed area for keeping animals) of any size having at least one transparent side in which water-dwelling plants and/or animals are kept and displayed. A fish keeper (also called an aquarist) uses the aquarium to keep (contain) specimens, such as fish, invertebrates, amphibians, aquatic reptiles such as turtles, and/or aquatic plants. The aquarium may be constructed of glass or high-strength acrylic. Cuboid aquaria are also known as fish tanks or tanks, while bowl-shaped aquaria are also known as fish bowls. Specialized equipment maintains appropriate water quality and other characteristics suitable for the aquarium's residents.

SUMMARY

It will be appreciated that there exists a need to mitigate (at least in part) at least one problem associated with the conventional (known) aquariums (also called the conventional technology). After much study of the known systems and methods with experimentation, an understanding of the problem and its solution has been identified and is articulated as follows:

Known equipment associated with aquariums could provide better maintenance of water quality, which may be more suitable for the aquarium's specimens. A major challenge (problem) facing the hobbyist is providing a reasonably healthy environment for the inhabitants of the aquarium, in which known cleaning systems fall short of mitigating this problem. Known methods for maintaining a relatively toxic-free aquatic environment are labor intensive for the hobbyist. Unwanted toxins are produced in the aquarium, and may cause relatively poor quality of aquarium water. Deadly toxins may be are formed from decaying materials, such as waste products (fecal matter), decaying plants (or dead plants), and/or uneaten food (as a result of overfeeding).

The gravel bed (stones or media) of an aquarium provides: (A) a decorative floor area of the aquarium, in which the floor supports live plants, rockery and ornaments, and/or (B) a natural progression, which is essentially the septic tank. Ongoing maintenance (cleaning) of the gravel bed (also called an aquarium bed) is imperative to a healthy aquarium environment. The gravel bed becomes a holding tank configured to receive toxic waste (toxic impurities or decaying organics). The toxic impurities may emanate from the gravel bed and into the aquatic environment (the water) of the aquarium. As the decaying organics dissolve into the water, the water chemistry and the water quality degrades, such as raising nitrite levels and/or ammonia levels, etc. For the case where toxic waste is not removed on a frequent basis from the aquarium, loss of aquatic life is more likely to occur.

At present, a known method for maintaining water quality is frequent changing of water (water replacement) contained in the aquarium. Water replacement should be performed at least twice a month or more frequently in order to ensure appropriate aquatic water quality and a reasonably healthy environment for the aquarium. For instance, a widely used, and accepted, method for performing a water change includes the usage of a hose (typically about 25 feet in length and three inches in diameter) having one end configured to fluidly attach to a faucet, and the other end to fluidly attach to a syphon. The syphon has a one inch diameter and is about 12 to about 16 inches in length. Part of the syphon is manually submerged into the gravel bed (by the hobbyist). Once the faucet is turned on, suction is formed in the hose and the syphon. The hobbyist positions and moves the syphon relative to the aquarium floor. This is done in such a way that the syphon, in use, vacuums and removes waste (toxic waste) from the aquarium floor via the suction that is formed in the syphon and the hose, in which water and toxic waste may then be removed the aquarium. The suction process slightly lifts some gravel from the gravel bed, and the debris (toxic waste) within the gravel bed is sucked up by the syphon and the hose and travels back through the hose and becomes disposed into the sink or bucket.

This known method is relatively time consuming, messy, inefficient, and may waste water. In addition, a total removal of all items from the aquarium may be warranted before the syphon and the hose are deployed (which would require more time and effort for the hobbyist). On the one hand, highly motived hobbyists would use this known method. On the other hand, the typical hobbyist would be less motivated to use this known method on a frequent basis in view of the drawbacks associated with this known method. As a result, this known method is a major reason for less-than-desirable aquarium maintenance.

In view of the foregoing, what is needed is a system that: (A) reduces (preferably eliminates) the need to remove anything from the aquarium for the purpose of improving the aquatic water quality (such as, cleaning the gravel bed); (B) reduces cleaning time and/or cleaning labor; (C) provides relatively faster and relatively effortless removal of toxic waste (decaying waste matter) from the aquarium; (D) improves removal and disposal of water containing relatively higher levels of toxic contamination from the aquarium; and/or (E) allows the hobbyist to simply add clean water to the aquarium while the toxic waste is removed (at least in part). As a result, the hobbyist may spend more time enjoying their aquarium rather than viewing the aquarium as an ongoing work project with drudgery.

To mitigate, at least in part, at least one problem associated with the conventional technology, there is provided (in accordance with a major aspect) an apparatus that includes a waste-movement system, which includes a bed-support assembly configured to receive, contain and support an aquarium bed of an aquarium. The waste-movement system also includes a vibration-source assembly configured to be positioned relative to the bed-support assembly. The vibration-source assembly is also configured to selectively generate and transmit vibrational energy to the aquarium bed while the aquarium water is made to flow in such a way that: (A) the gravel of the aquarium bed becomes, at least in part, spaced apart (at least in part) from one another (or becomes dispersed from one another); and (B) the aquarium water moves, at least in part, the liquefied waste and the solid waste through the aquarium bed from a first interior section to a second interior section of the aquarium.

To mitigate, at least in part, at least one problem associated with the conventional technology, there is provided (in accordance with a major aspect) an apparatus that includes a waste-movement system. The waste-movement system includes a bed-support assembly configured to be inserted into, and removable from, an aquarium, in which the aquarium is configured to contain aquarium water, liquefied waste and solid waste. The bed-support assembly is also configured to be positioned between a first interior section and a second interior section of the aquarium.

The bed-support assembly is also configured to receive, contain and support an aquarium bed, in which the aquarium bed includes gravel. A vibration-source assembly is configured to be positioned relative to the bed-support assembly containing the aquarium bed. The vibration-source assembly is also configured to selectively generate and transmit vibrational energy to the aquarium bed while the aquarium water is made to flow from the first interior section to the second interior section of the aquarium. This is done in such a way that (A) the gravel of the aquarium bed becomes, at least in part, spaced apart (at least in part) from one another (or becomes dispersed from one another), and (B) the aquarium water moves, at least in part, the liquefied waste and the solid waste through the aquarium bed from the first interior section to the second interior section of the aquarium.

To mitigate, at least in part, at least one problem associated with conventional technology, there is provided (in accordance with a major aspect) a method of operating a waste-movement system. The method includes (A) inserting a bed-support assembly into an aquarium, in which the bed-support assembly is removable from the aquarium, and in which the aquarium is configured to contain aquarium water, liquefied waste and solid waste; (B) positioning the bed-support assembly between a first interior section and a second interior section of the aquarium; (C) receiving, containing and supporting an aquarium bed in the bed-support assembly, in which the aquarium bed includes gravel; (D) positioning a vibration-source assembly relative to the bed-support assembly containing the aquarium bed; and (E) using the vibration-source assembly to selectively generate and transmit vibrational energy to the aquarium bed while the aquarium water is made to flow from the first interior section to the second interior section of the aquarium. This is done in such a way that (a) the gravel of the aquarium bed becomes, at least in part, spaced apart (at least in part) from one another (or becomes dispersed from one another), and (b) the aquarium water moves, at least in part, the liquefied waste and the solid waste through the aquarium bed from the first interior section to the second interior section of the aquarium.

Other aspects are identified in the claims. Other aspects and features of the non-limiting embodiments may now become apparent to those skilled in the art upon review of the following detailed description of the non-limiting embodiments with the accompanying drawings. This Summary is provided to introduce concepts in simplified form that are further described below in the Detailed Description. This Summary is not intended to identify key features or essential features of the disclosed subject matter, and is not intended to describe each disclosed embodiment or every implementation of the disclosed subject matter. Many other novel advantages, features, and relationships will become apparent as this description proceeds. The figures and the description that follow more particularly exemplify illustrative embodiments.

DETAILED DESCRIPTION OF THE DRAWINGS

The non-limiting embodiments may be more fully appreciated by reference to the following detailed description of the non-limiting embodiments when taken in conjunction with the accompanying drawings, in which.

Figure 1:
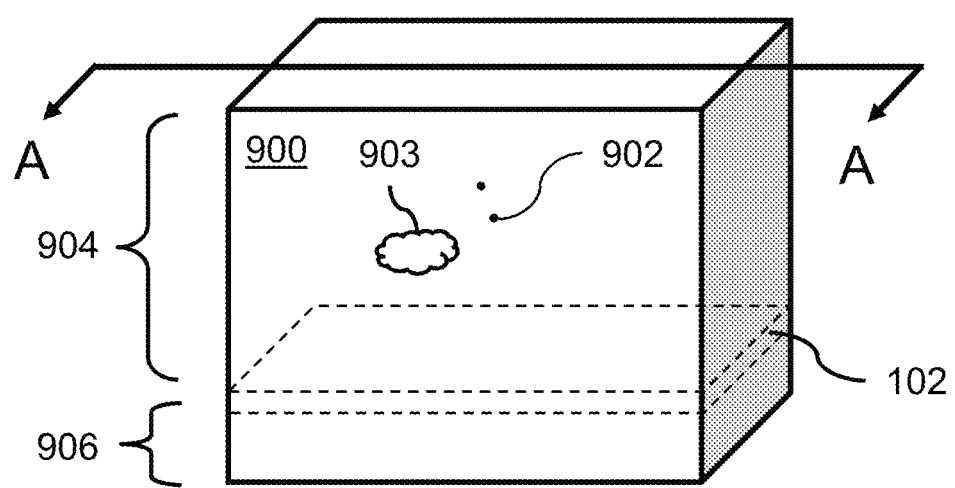
FIG. 1 depicts a perspective view of an embodiment of a waste-movement system for an aquarium.

The drawings are not necessarily to scale and may be illustrated by phantom lines, diagrammatic representations and fragmentary views. In certain instances, details unnecessary for an understanding of the embodiments (and/or details that render other details difficult to perceive) may have been omitted. Corresponding reference characters indicate corresponding components throughout the several figures of the drawings. Elements in the several figures are illustrated for simplicity and clarity and have not been drawn to scale. The dimensions of some of the elements in the figures may be emphasized relative to other elements for facilitating an understanding of the various disclosed embodiments. In addition, common, but well-understood, elements that are useful or necessary in commercially feasible embodiments are often not depicted to provide a less obstructed view of the embodiments of the present disclosure.

LISTING OF REFERENCE NUMERALS USED IN THE DRAWINGS 102 waste-movement system
104 bed-support assembly
106 vibration-source assembly
108 vibration-damping assembly
110 filter assembly
112 base assembly
114 pump assembly
116 exit assembly
118 valve assembly
120 drain assembly
121 upstanding continuous peripheral side wall
122 raised ledge
123 raised perimeter wall 124 latch assembly
125 detent device
126 support structure
127 latch receiver
128 power supply
130 hopper assembly
131 exit portal
132 stand-off assembly
134 exit port
136 sloped floors
900 aquarium
901 bottom floor
902 solid waste
903 liquefied waste
904 first interior section
906 second interior section
908 aquarium bed
910 aquatic life
912 user
914 side wall
916 pail
918 container

DETAILED DESCRIPTION OF THE NON-LIMITING EMBODIMENT(S)

The following detailed description is merely exemplary and is not intended to limit the described embodiments or the application and uses of the described embodiments. As used, the word "exemplary" or "illustrative" means "serving as an example, instance, or illustration." Any implementation described as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure. The scope of may be defined by the claims (in which the claims may be amended during patent examination after filing of this application). For the description, the terms "upper," "lower," "left," "rear," "right," "front," "vertical," "horizontal," and derivatives thereof shall relate to the examples as oriented in the drawings. There is no intention to be bound by any expressed or implied theory in the preceding Technical Field, Background, Summary or the following detailed description. It is also to be understood that the devices and processes illustrated in the attached drawings, and described in the following specification, are exemplary embodiments (examples), aspects and/or concepts defined in the appended claims. Hence, dimensions and other physical characteristics relating to the embodiments disclosed are not to be considered as limiting, unless the claims expressly state otherwise. It is understood that the phrase "at least one" is equivalent to "a". The aspects (examples, alterations, modifications, options, variations, embodiments and any equivalent thereof) are described regarding the drawings. It should be understood that the invention is limited to the subject matter provided by the claims, and that the invention is not limited to the particular aspects depicted and described.

FIG. 1 depicts a perspective view of an embodiment of a waste-movement system 102 for an aquarium 900.

The aquarium 900 may have any shape, form or size. The aquarium 900 is configured to contain aquarium water, liquefied waste 903 and solid waste 902. The liquefied waste 903 and solid waste 902 are released by aquatic life 910 contained in the aquarium 900. The aquatic life 910 may include fish, plants, etc.

The waste-movement system 102 is configured to be located, at least in part, in the interior of the aquarium 900. The waste-movement system 102 is configured to facilitate, at least in part, the movement of (flushing op the liquefied waste 903 and the solid waste 902 contained in the aquarium water contained in the aquarium 900. The removal of the liquefied waste 903 and the solid waste 902 from the interior of the aquarium 900 (A) improves (at least in part) the aquarium water quality, (B) provides (at least in part) a relatively heathier environment for the aquatic life housed in the aquarium 900, (C) permits relatively easier maintenance of the aquarium 900, (D) lowers frustration for the hobbyist by providing relatively easier maintenance of the aquarium 900, and/or (E) requires relatively less time for performing maintenance. A technical advantage of the waste-movement system 102 is that the aquatic environment of the aquarium 900 is improved once the solid waste 902 and the liquefied waste 903 is removed (at least in part) from the interior of the aquarium 900.

For newly constructed aquariums, the embodiments associated with FIG. 2 to FIG. 20 are applicable, in which the waste-movement system 102 may be (at least in part) integrated with the aquarium 900, or the waste-movement system 102 is provided with the aquarium 900 when the hobbyist purchases the aquarium 900 from a retailer. For instance, an aspect of (or a component of) the waste-movement system 102 may be permanently affixed to an aspect of (or a component of) the aquarium 900.

Figure 21:
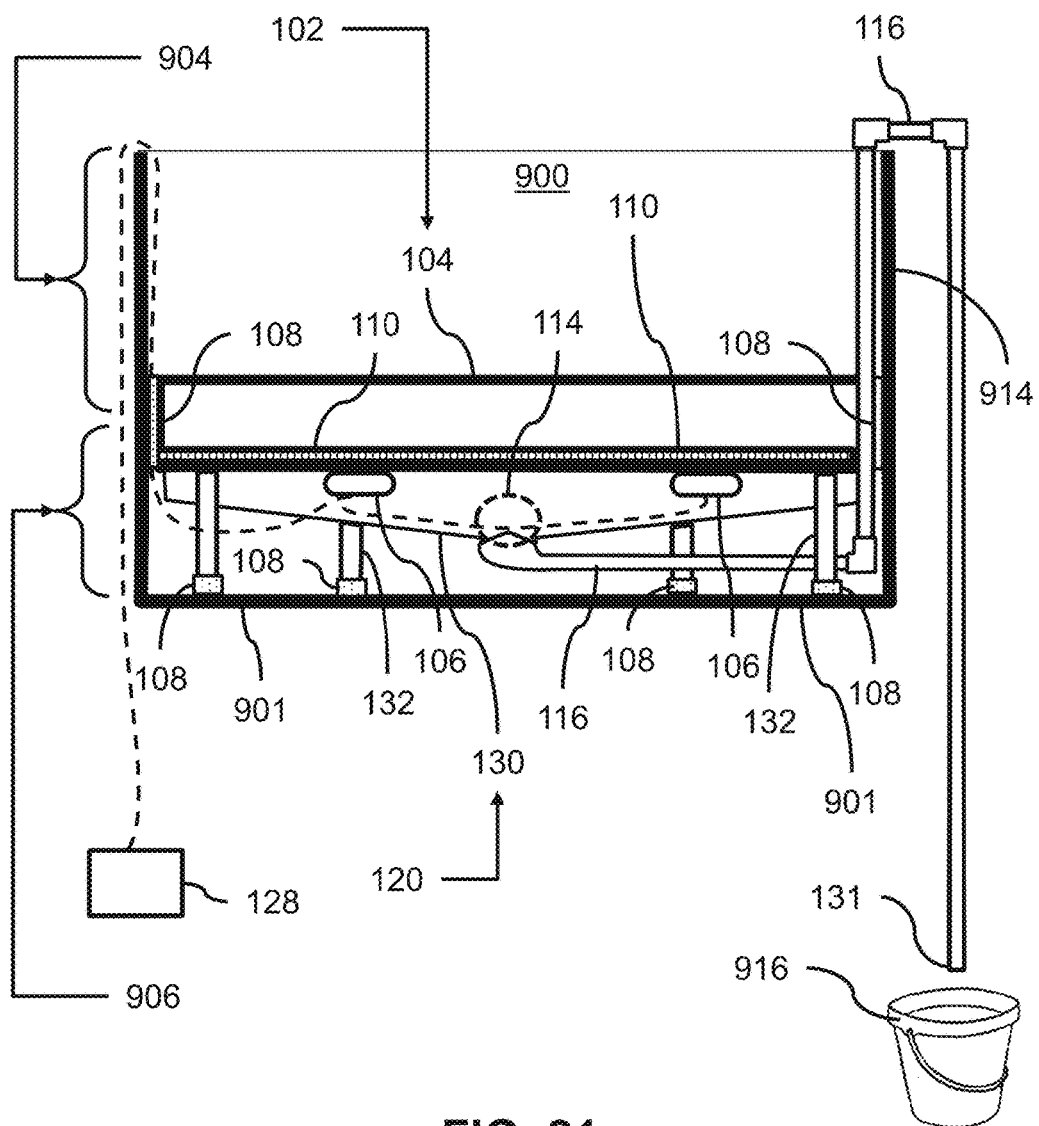
FIG. 21 depicts a cross-sectional view of an embodiment of the waste-movement system of FIG. 1.
Figure 22:
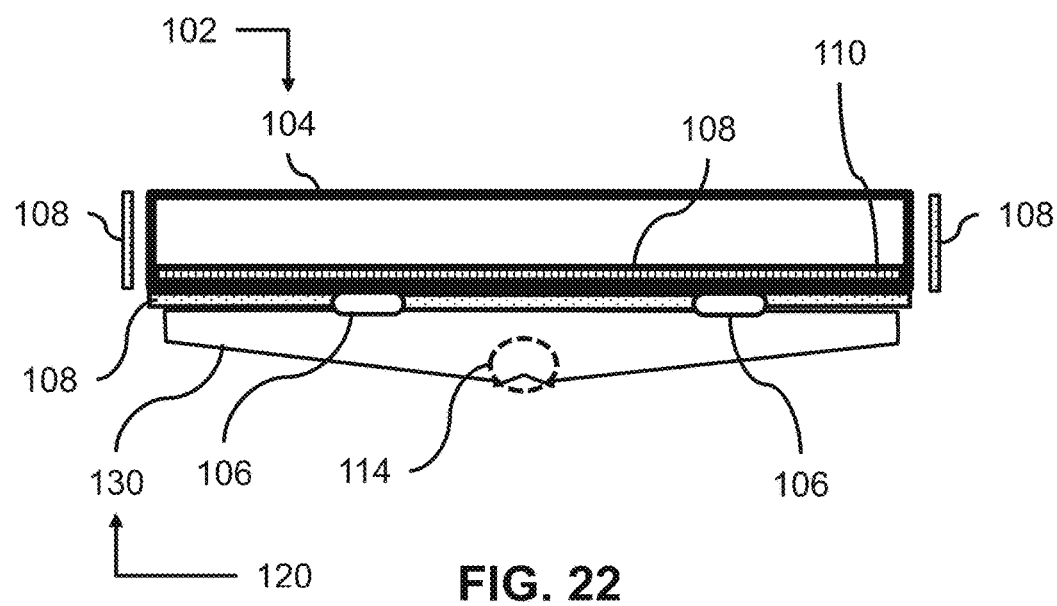
FIG. 22 and FIG. 23 depict cross-sectional views of embodiments of the waste-movement system of FIG. 1.
Figure 23:
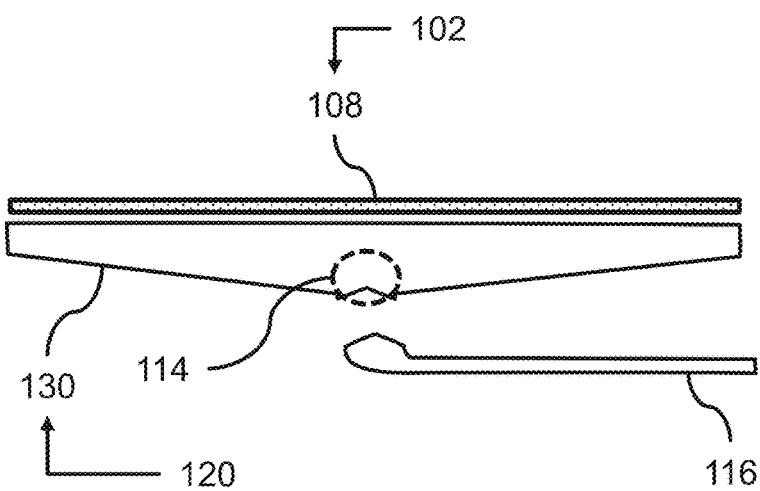

For the retrofitting of conventional aquariums (in which these types of aquariums are not to be structurally altered), the embodiments associated with FIG. 21 to FIG. 23 are applicable, and in which the waste-movement system 102 is configured to be inserted into, and removable from, the aquarium 900. For this case, the waste-movement system 102 and the aquarium 900 are sold separately.

It will be appreciated that some of the technical features associated with (deployed in) the embodiments as depicted in FIG. 2 to FIG. 20 may be deployed with the embodiments as depicted in FIG. 21 to FIG. 23 (if desired or if possible). It will be appreciated that some of the technical features associated with (deployed in) the embodiments as depicted in FIG. 21 to FIG. 23 may be deployed with the embodiments as depicted in FIG. 2 to FIG. 20 (if desired or if possible). A person skilled in the art would be able to recognize which of the technical features described in association with all of the FIGS. may be deployed in any particular embodiment.

Figure 2:
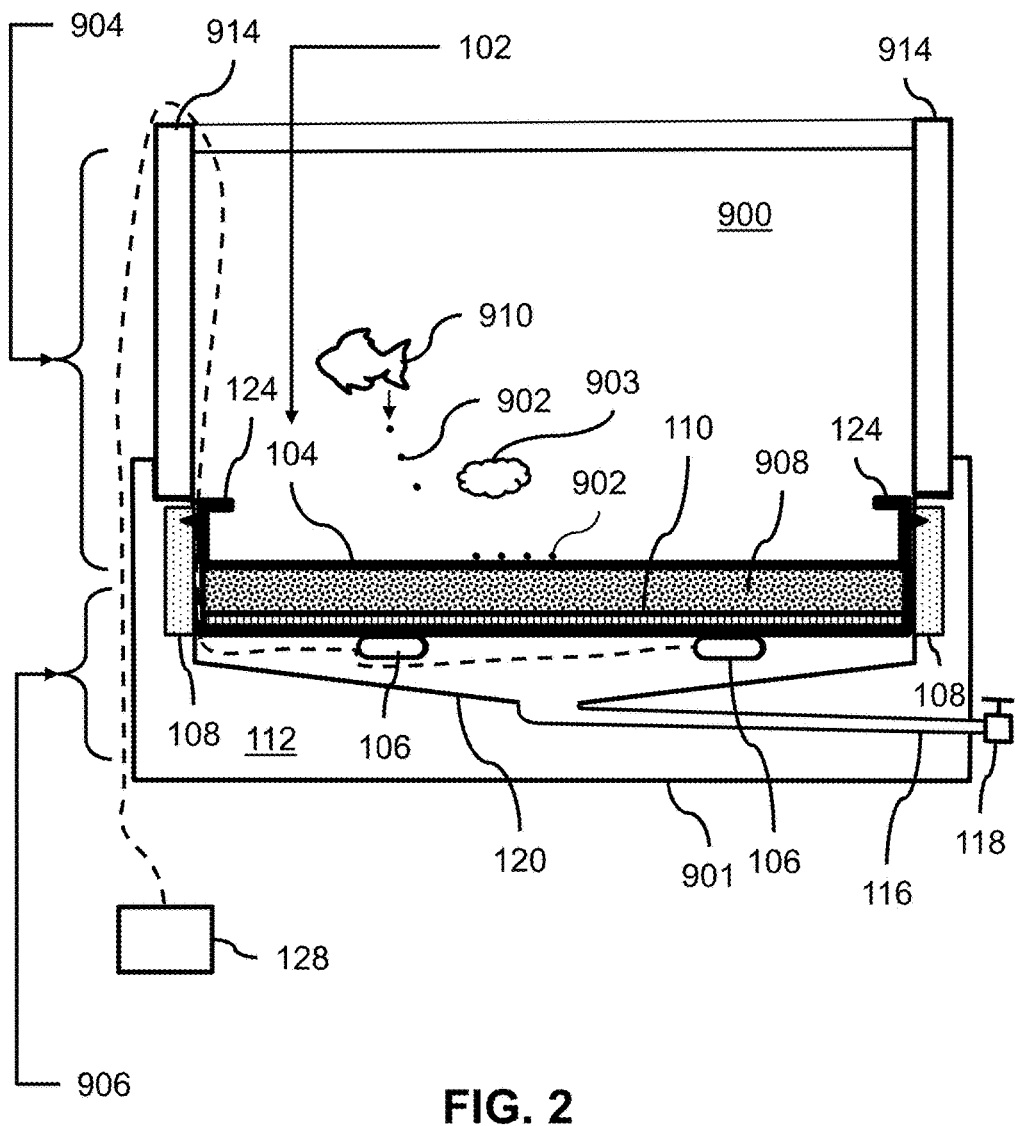
FIG. 2 and FIG. 3 depict cross-sectional views of embodiments of the waste-movement system of FIG. 1.
Figure 3:
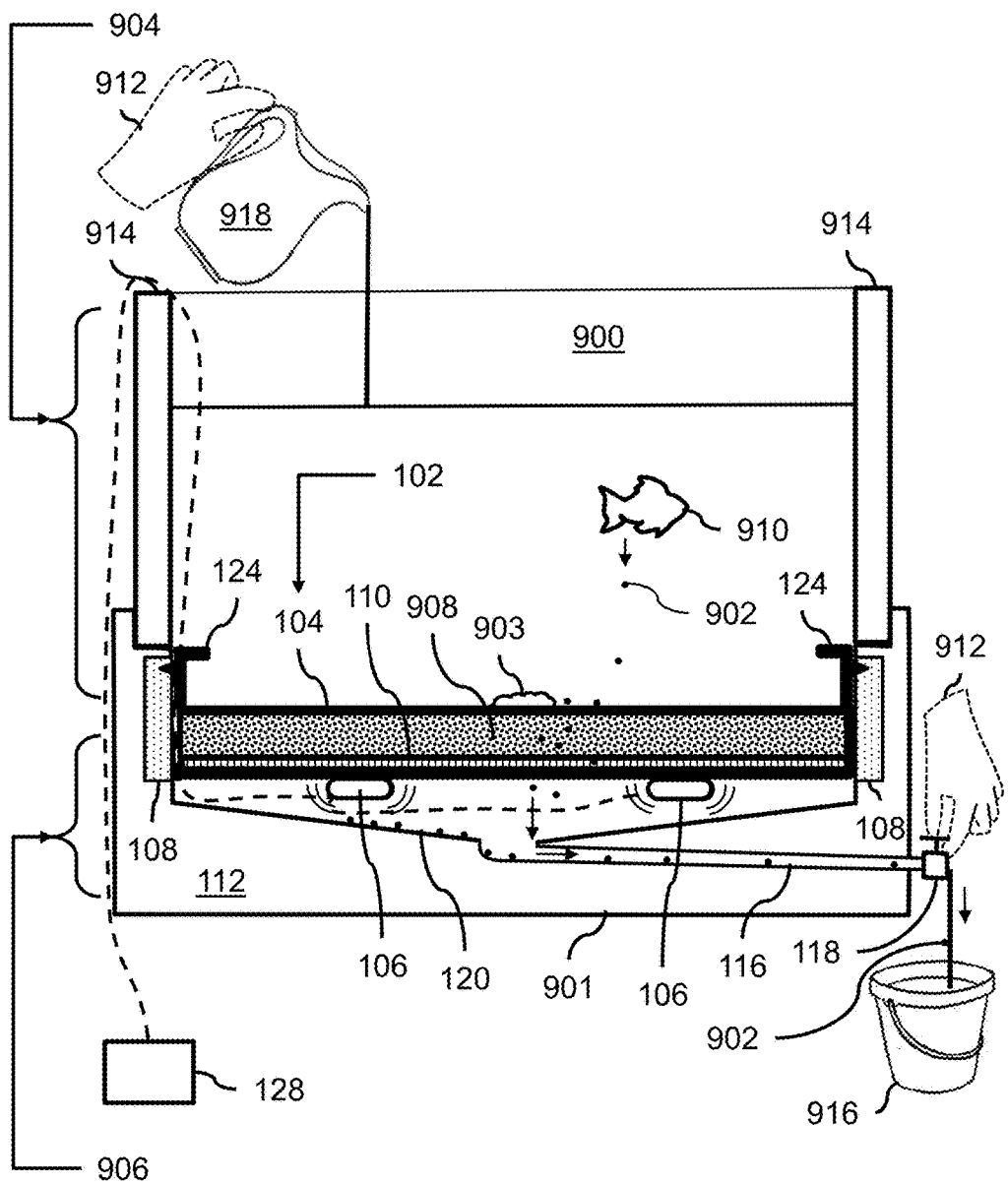

FIG. 2 and FIG. 3 depict cross-sectional views (taken along a cross-sectional line A-A of FIG. 1) of embodiments of the waste-movement system 102 of FIG. 1.

As previously stated, for newly constructed aquariums, the embodiments associated with FIG. 2 to FIG. 20 are applicable. FIG. 2 depicts the case where the waste-movement system 102 is not activated to move waste. FIG. 3 depicts the case where the waste-movement system 102 is activated (selectively activated) to move waste.

In accordance with the embodiments as depicted in FIG. 2 and FIG. 3, the waste-movement system 102 is configured to facilitate the movement (flushing), at least in part, of the aquarium water, the liquefied waste 903 and the solid waste 902 away from a first interior section 904 of the aquarium 900, through an aquarium bed 908, and to a second interior section 906 of the aquarium 900. In accordance with the embodiment as depicted in FIG. 3, the movement of the aquarium water, the liquefied waste 903 and the solid waste 902 is done in response to gravity being permitted to pull (move) the aquarium water, the liquefied waste 903 and the solid waste 902 (from the first interior section 904, through the aquarium bed 908, and to the second interior section 906) while vibrational energy is imparted to (and received by) the aquarium bed 908. The vibrational energy that is imparted to the aquarium bed 908 is configured to urge (vibrate) the pieces of gravel (contained in the aquarium bed 908) in such a way that the movement of the aquarium water, the liquefied waste 903 and the solid waste 902 through the pieces of gravel is not impaired or is not stopped by the aquarium bed 908. In this manner, the waste material may be removed, at least in part, from the aquarium bed 908. Once the waste is removed (at least in part) from the aquarium bed 908, the waste may then be removed from the second interior section 906 of the aquarium 900.

In accordance with a major embodiment, which is applicable to all of the drawings, the apparatus includes (and is not limited to) a waste-movement system 102. The waste-movement system 102 includes (and is not limited to) a synergistic combination of a bed-support assembly 104 and a vibration-source assembly 106.

The bed-support assembly 104 is configured to be inserted into, and removable from, the aquarium 900. The bed-support assembly 104 may be called a gravel-support assembly. The bed-support assembly 104 is also configured to be positioned between a first interior section 904 and a second interior section 906 of the aquarium 900. The first interior section 904 may be called an upper interior section or top interior section. The second interior section 906 may be called a lower interior section or a bottom interior section. The bed-support assembly 104 is also configured to receive, contain and support the aquarium bed 908.

Preferably, the aquarium bed 908 includes gravel. The gravel may be called stones, loose material, media, etc. and any equivalent thereof. The waste-movement system 102 is configured to be installed (positioned) relative to the aquarium bed 908 of the aquarium 900. The aquarium bed 908 is configured to receive, and retain, solid waste 902 (for the case where the waste-movement system 102 is deactivated, as depicted in FIG. 2). The aquarium water contained in the aquarium 900 includes the liquefied waste 903. The liquefied waste 903 may be dissolved from (formed from) the solid waste 902. The solid waste 902 may include debris, organic waste, decaying debris, uneaten fish food, waste material, and any equivalent thereof. Some of the solid waste 902 may be created by the aquatic life 910, such as fish, plants, etc. and any equivalent thereof. The solid waste 902 has accumulated in or on the aquarium bed 908. The solid waste 902 may be positioned on the aquarium bed 908 or positioned in (received in) the aquarium bed 908 (for the case where the waste-movement system 102 is deactivated, as depicted in FIG. 2).

The vibration-source assembly 106 is configured to be positioned relative to the bed-support assembly 104 that contains (supports) the aquarium bed 908. For instance, the vibration-source assembly 106 may be configured to be coupled (either directly or indirectly) to the bed-support assembly 104 that contains the aquarium bed 908.

Referring to the embodiment as depicted in FIG. 3, the vibration-source assembly 106 is also configured to selectively generate and transmit vibrational energy to the aquarium bed 908 while the aquarium water is made to flow from the first interior section 904 to the second interior section 906 of the aquarium 900 (as depicted in FIG. 3). This is done in such a way that (A) the gravel of the aquarium bed 908 becomes spaced apart (at least in part) from one another (or becomes dispersed, at least in part, from one another), and (B) the aquarium water moves, at least in part, the liquefied waste 903 and the solid waste 902 through the aquarium bed 908 from the first interior section 904 to the second interior section 906 of the aquarium 900.

For instance, the vibration-source assembly 106 may also be configured to selectively generate and transmit (either directly or indirectly) the vibrational energy to the bed-support assembly 104. In turn, the vibrational energy is then transmitted from the bed-support assembly 104 to the aquarium bed 908 (while the aquarium water is made to flow from the first interior section 904 to the second interior section 906 of the aquarium 900).

The vibration-source assembly 106 may include any type of assembly configured to generate and emit vibrational energy (such as, mechanical vibration, acoustic vibration, etc.) once the vibration-source assembly 106 is activated.

It will be appreciated that for the case where items are to be positioned on the gravel (stones) received in the bed-support assembly 104 (such items may include rocks, plants are mounted into the gravel, etc.), the user would relocate the items away from the bed-support assembly 104, and then the user would activate the vibration-source assembly 106.

Figure 4:
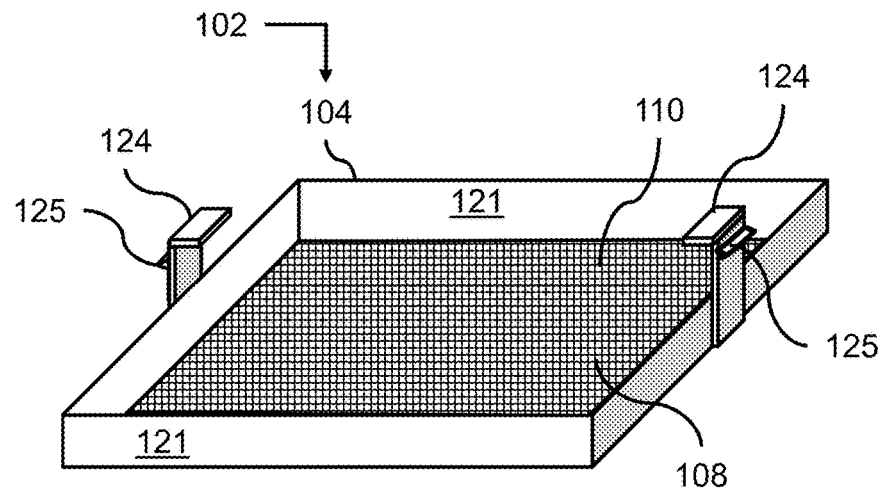
FIG. 4 and FIG. 5 depict a perspective view (FIG. 4) and a top view (FIG. 5) of embodiments of the waste-movement system of FIG. 1.

In accordance with the embodiments associated with FIG. 2 and FIG. 3, the vibration-source assembly 106 is further configured to be positioned relative to a base assembly 112 (of the aquarium 900). The base assembly 112 may be called an aquarium base assembly, a boot, a boot assembly, a base, etc. The base assembly 112 is configured to form, at least in part, a bottom portion of the aquarium 900. The base assembly 112 is also configured to sealably receive a side wall 914 of the aquarium 900. The base assembly 112 is also configured to selectively couple to, and decouple from, the bed-support assembly 104 (by using a latch assembly 124, as depicted in FIG. 4, and any equivalent thereof). The base assembly 112 includes (and is not limited to) a drain assembly 120. The base assembly 112 may form, or provide, the drain assembly 120. Preferably, the base assembly 112 is integrated with the drain assembly 120. The drain assembly 120 may be called a waste-conduit assembly or a flush assembly. The drain assembly 120 includes an exit assembly 116 that is positioned at (proximate to) a bottom floor 901 of the aquarium 900. The drain assembly 120 is positioned by the base assembly 112 relative to the bed-support assembly 104 (this is done in such a way that the drain assembly 120 is positioned underneath the bed-support assembly 104 once the base assembly 112 is selectively coupled to the bed-support assembly 104). The drain assembly 120 is also configured to receive the flow of aquarium water, the solid waste 902 and the liquefied waste 903 from the bed-support assembly 104 once the aquarium water is made to flow from the first interior section 904 to the second interior section 906 of the aquarium 900 (while the vibrational energy shakes the aquarium bed 908). The drain assembly 120 is also configured to direct the flow of aquarium water, the solid waste 902 and the liquefied waste 903, which was received from the bed-support assembly 104, to an exterior of the aquarium 900 (via a valve assembly 118 positioned at the distal end of the exit assembly 116). The valve assembly 118 (also called a shut-off valve) is coupled to a drain assembly 120 (also called tubing). The drain assembly 120 is configured to discharge the solid waste 902 from the aquarium 900.

In accordance with the embodiment associated with FIG. 2, the vibration-source assembly 106 is also configured to selectively stop the generation of the vibrational energy (as depicted in FIG. 2). This is done in such a way that (A) the vibrational energy is not imparted to, and is not received by, the aquarium bed 908, (B) the aquarium bed 908 receives and retains the solid waste 902, and (C) the solid waste 902 does not move through the aquarium bed 908 from the first interior section 904 to the second interior section 906 of the aquarium 900.

In accordance with the embodiment associated with FIG. 3, the bed-support assembly 104 is configured to (A) receive, at least in part, the vibrational energy from the vibration-source assembly 106, and (B) impart, at least in part, the vibrational energy to the aquarium bed 908 once the bed-support assembly 104 receives the vibrational energy.

The vibration-source assembly 106 is configured to impart (once activated) the vibrational energy (either directly or indirectly) to the aquarium bed 908. This is done in such a way that once the vibrational energy is received (at least in part) by the aquarium bed 908, the gravel is shaken so that small spaces are created between the pieces of the vibrating gravel. While the vibrational energy is being received by the aquarium bed 908 and while the gravel is being shaken (to form small spaces or voids between the pieces of gravel), the aquarium water, the liquefied waste 903 and the solid waste 902 are made to move (flush) through the aquarium bed 908 (from the first interior section 904 to the second interior section 906 of the aquarium 900). The solid waste 902 is urged to move (flush) through the aquarium bed 908 away from the first interior section 904 and toward the second interior section 906. This occurs in response to the application of vibrational energy to the aquarium bed 908 while the water of the aquarium 900 is moved (is made to move), at least in part, from the first interior section 904 of the aquarium 900, through the aquarium bed 908, to the second interior section 906 of the aquarium 900. The vibration-source assembly 106 is configured to impart (in use) the vibrational energy (either directly or indirectly) to the aquarium bed 908, and the vibrational energy is used for loosening the gravel and the solid waste 902 positioned on or in the gravel contained in the aquarium bed 908.

In accordance with the embodiments associated with FIG. 2 and FIG. 3, the bed-support assembly 104 includes (and is not limited to) a filter assembly 110. The filter assembly 110 may include a mesh (and any equivalent thereof). The filter assembly 110 is configured to receive and support the aquarium bed 908 relative to the second interior section 906 of the aquarium 900. The filter assembly 110 is configured (sized) to (A) contain (support) the aquarium bed 908 in the bed-support assembly 104, and (B) block movement of the pieces of gravel (gravel) of the aquarium bed 908 away from the bed-support assembly 104. The filter assembly 110 is configured (sized) to permit the movement of the solid waste 902 away from the bed-support assembly 104 (when the aquarium bed 908 receives the vibrational energy and while the aquarium water is made to move from the first interior section 904 to the second interior section 906). The solid waste 902, which is positioned or located in the bed-support assembly 104, in use, (A) moves past the aquarium bed 908 (in which the gravel is vibrating), and (B) moves through the filter assembly 110 and away from the bed-support assembly 104 (while the aquarium water is made to flow through the aquarium 900).

In accordance with the embodiments associated with FIG. 2 and FIG. 3, the bed-support assembly 104 is further configured to be positioned relative to a vibration-damping assembly 108. The vibration-damping assembly 108 is configured to dampen, at least in part, the transfer of the vibrational energy from the bed-support assembly 104 to the aquarium 900. For instance, the vibration-damping assembly 108 is positionable between the bed-support assembly 104 and the base assembly 112 in such a way that the vibrational energy that may be transmitted from the bed-support assembly 104 to the base assembly 112 is reduced (at least in part). This arrangement may reduce the transfer of unwanted vibrational energy to the base assembly 112.

In accordance with a preferred embodiment, a power supply 128 is electrically connected to the vibration-source assembly 106. The vibration-source assembly 106 may include an electrical motor, etc., and any equivalent thereof. The vibration-source assembly 106 is attached to (affixed to) the bed-support assembly 104 (preferably to the underside of the bed-support assembly 104). The power supply 128 may include a DC (Direct Current) power source, or a low voltage DC power source, and any equivalent thereof. An electrical wire is used to electrically connect the power supply 128 to the vibration-source assembly 106. The electrical wire may be aligned along a corner of the aquarium 900, etc. For instance, electrical power wires (leads) are attached to the vibration-source assembly 106, and are aligned along an underside of the bed-support assembly 104, upwardly along a back inside corner of the aquarium 900, and over to a switch (known and not depicted). The switch may be mounted to an aquarium canopy (known and not depicted).

Referring to the embodiment as depicted in FIG. 3, the user 912 positions a pail 916 at the exit assembly 116. The pail 916 is configured to receive the liquefied waste 903 and the solid waste 902 from the aquarium 900. The user 912 opens a valve assembly 118 positioned on the distal end of the exit assembly 116 (this is done in such a way that the liquefied waste 903 and the solid waste 902 flows from the second interior section 906 of the aquarium 900 to the pail 916). To replenish the water leaving the aquarium 900, the user 912 positions a container 918 having clean water (filtered water) over the top entrance of the aquarium 900, and the user 912 urges the clean water to move from the container 918 into the aquarium 900. The solid waste 902 may be discharged into the pail 916 or a sink by allowing the aquarium water to exit the second interior section 906 of the aquarium 900 through the exit assembly 116 located near the bottom of the aquarium 900. The exit assembly 116 leads out from a side wall of the aquarium 900. The valve assembly 118 is configured to control the exit of water and solid waste 902 from the exit assembly 116 (from the second interior section 906 of the aquarium 900).

The bed-support assembly 104 may be molded. The bed-support assembly 104 is configured to support the weight of the aquarium bed 908. The bed-support assembly 104 is also configured to position the aquarium bed 908 in a spaced-apart relationship to a bottom floor 901 of the aquarium 900. This is done in such a way that a space (void) is formed between the underside of the bed-support assembly 104 and the bottom floor 901 of the aquarium 900.

Preferably, the bed-support assembly 104 is configured to cover the entire foot print of the aquarium 900 (or the area of the bottom floor 901 of the aquarium 900).

Preferably, the bed-support assembly 104 is supported and positioned approximately two inches above the bottom floor 901 of the aquarium 900. For instance, load points (which may be called legs, and which are known and not depicted for ease of understanding of the drawings) may be positioned relative to the bed-support assembly 104 in such a way that the load points maintain the bed-support assembly 104 in a relatively stable and stationary position relative to the aquarium 900.

Figure 5:
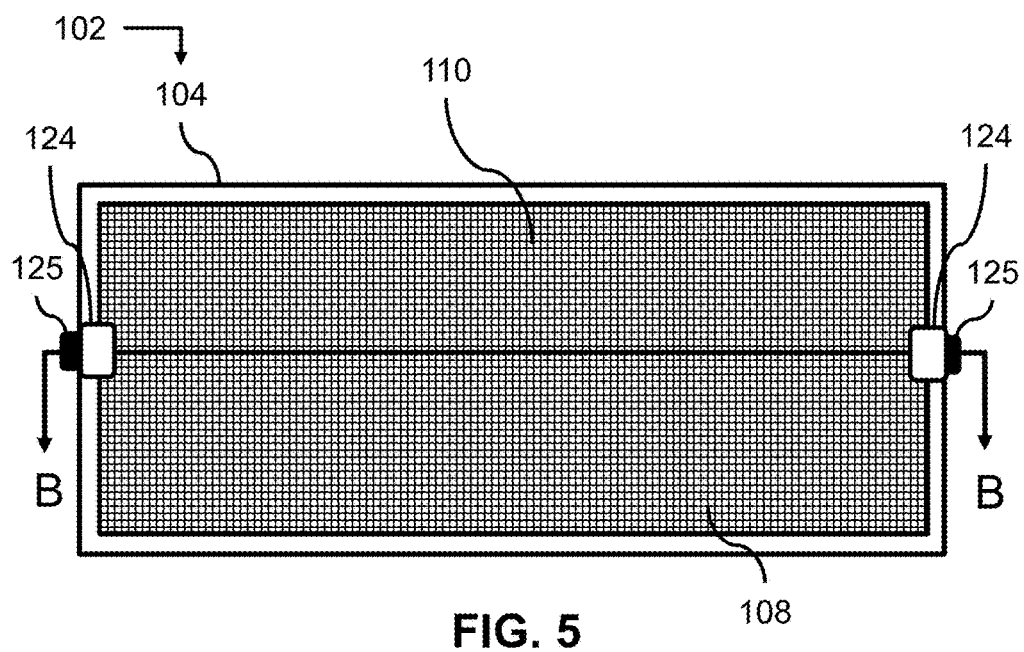

FIG. 4 and FIG. 5 depict a perspective view (FIG. 4) and a top view (FIG. 5) of embodiments of the waste-movement system 102 of FIG. 1.

In accordance with the embodiments as depicted in FIG. 4 and FIG. 5, the waste-movement system 102 includes the bed-support assembly 104 (which may be called a shaker assembly). The bed-support assembly 104 includes (supports) the filter assembly 110 (which may be called a mesh or a screen). The filter assembly 110 is configured to receive and support the weight of the aquarium bed 908. Preferably, the filter assembly 110 is configured to form (provide) perforations, which are configured (sized) to allow the solid waste 902 to fall through the filter assembly 110 (once the bed-support assembly 104 receives the vibrational energy) but prevent the gravel of the aquarium bed 908 from falling through the filter assembly 110 (and leaving the bed-support assembly 104).

The filter assembly 110 is configured to be perforated in such a way that (A) the solid waste 902 may pass through the filter assembly 110 in response to the application of vibrational energy to the bed-support assembly 104 (while aquarium water flows through the filter assembly 110 and the bed-support assembly 104), (B) the gravel of the aquarium bed 908 remains contained (confined) by the filter assembly 110 in the bed-support assembly 104 (while aquarium water flows through the filter assembly 110 and the bed-support assembly 104), and (C) the solid waste 902, in use, is received (collected) in the space that is formed between the underside of the bed-support assembly 104 and the bottom floor 901 of the aquarium 900 (the space is located in the second interior section 906).

For the case where the vibration-damping assembly 108 (such as an electrical motor, etc.,) is activated, vibrating action shakes the gravel contained in the bed-support assembly 104, and the shaking gravel shakes with sufficient displacement that the solid waste 902 is allowed to be transported away from the aquarium bed 908 (once the aquarium water is made to flow through the bed-support assembly 104). The combination of the application of vibration to the bed-support assembly 104 along with the urging of the aquarium water to flow through the bed-support assembly 104 (by gravity being used to pull the aquarium water through the bed-support assembly 104) separates the solid waste 902 from the aquarium bed 908 that is contained in the bed-support assembly 104.

Preferably, the bed-support assembly 104 includes an upstanding continuous peripheral side wall 121 (hereafter referred to as a side wall). For instance, the side wall 121 may be two inches in vertical height, and may extend along the outer perimeter of the bed-support assembly 104. This is done in such a way that the side wall 121 holds and maintains the gravel of the aquarium bed 908 within the bed-support assembly 104 (as depicted in FIG. 3).

The bed-support assembly 104 includes a latch assembly 124 positioned on opposite sides of the bed-support assembly 104. Preferably, the latch assembly 124 includes a detent device 125. The latch assembly 124 is configured to selectively connect the bed-support assembly 104 to the base assembly 112 of the aquarium 900.

Figure 6:
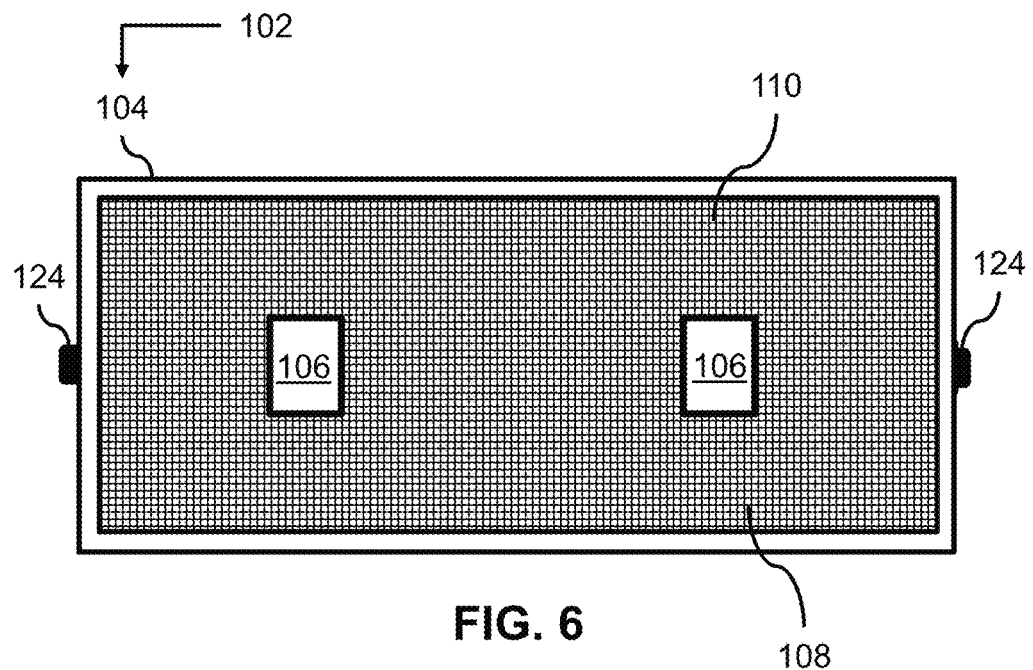
FIG. 6 and FIG. 7 depict bottom views of embodiments of the waste-movement system of FIG. 1.
Figure 7:
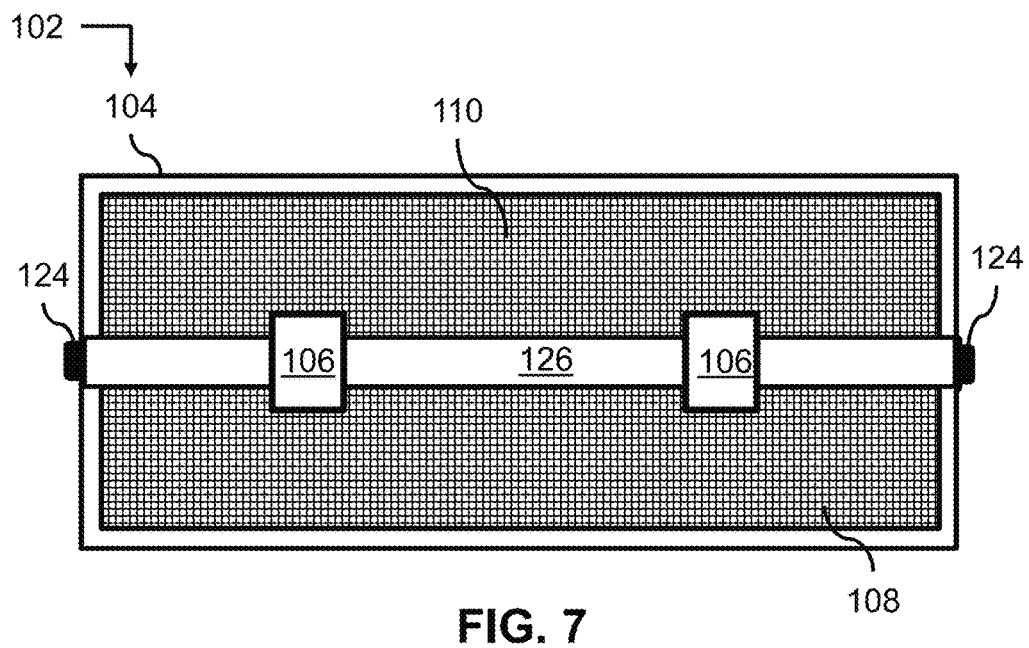

FIG. 6 and FIG. 7 depict bottom views of embodiments of the waste-movement system 102 of FIG. 1.

In accordance with the embodiments as depicted in FIG. 6 and FIG. 7, the vibration-source assembly 106 may include a waterproof, vibrating electric motor, which may be powered by DC (Direct Current) or AC (Alternating Current) electrical power. An eccentric load may be mounted to the shaft of the electric motor. The vibrating electric motor may be encapsulated in a housing (a plastic waterproof housing), and may be attached at a predetermined location determined by the size of the bed-support assembly 104. For the case where an electric motor is used, vibration occurs once an offset (non symmetrical) mass is attached to its shaft, and the shaft is rotated. As the electric motor rotates the eccentric weight, the centripetal forces are unbalanced and cause an oscillating (reciprocating) displacement of the electric motor, in which the repeated displacement is what we know as vibration.

The bed-support assembly 104 is positioned relative to (coupled to, either directly or indirectly) the vibration-source assembly 106. Preferably, the vibration-source assembly 106 is mounted to (affixed to) the bed-support assembly 104. The vibration-source assembly 106 is coupled to (either directly or indirectly) the filter assembly 110. Alternatively, the vibration-source assembly 106 is coupled to (either directly or indirectly) the bed-support assembly 104. The vibration-source assembly 106 is coupled to (either directly or indirectly) the bed-support assembly 104. The vibration-source assembly 106 may be connected to any part of the bed-support assembly 104, as may be needed or required or desired.

Referring to the embodiment as depicted in FIG. 7, the vibration-source assembly 106 is coupled to a support structure 126 configured to be mounted (affixed to) the bed-support assembly 104. In this manner, the weight of the vibration-source assembly 106 is not supported by the filter assembly 110, and the weight of the vibration-source assembly 106 is supported by the frame of the bed-support assembly 104. Nevertheless, the vibrational energy generated by the vibration-source assembly 106 may be imparted to the filter assembly 110 and to the bed-support assembly 104. The support structure 126 spans across (and is attached to) the opposite sides of the bed-support assembly 104.

Figure 8:
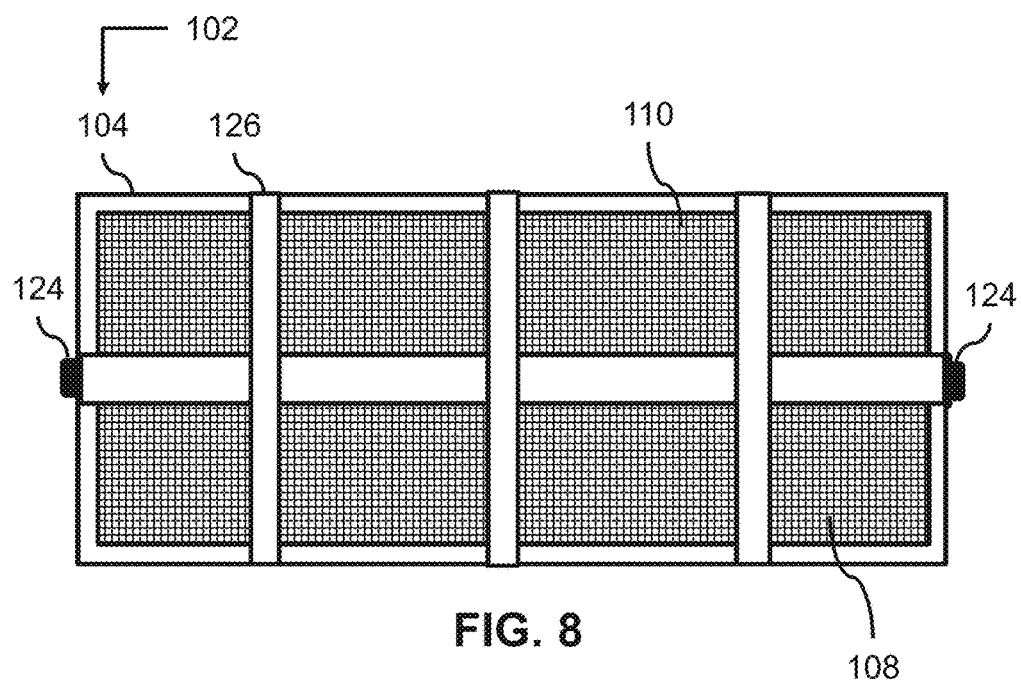
FIG. 8 and FIG. 9 depict a bottom view (FIG. 8) and a cross-sectional view (FIG. 9) of embodiments of the waste-movement system of FIG. 1.
Figure 9:
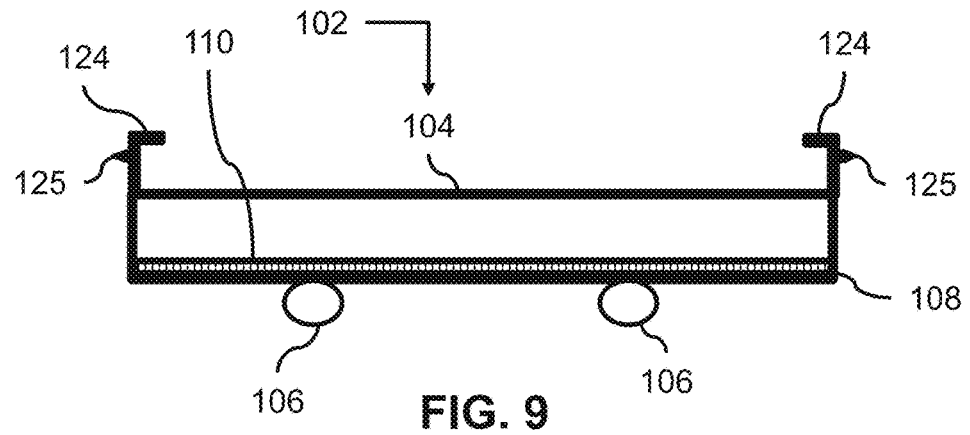

FIG. 8 and FIG. 9 depict a bottom view (FIG. 8) and a cross-sectional view (FIG. 9, taken along a cross-sectional line B-B of FIG. 5) of embodiments of the waste-movement system 102 of FIG. 1.

In accordance with the embodiments as depicted in FIG. 8 and FIG. 9, the support structure 126 is configured to span across (and connect to) opposite facing portions of the bed-support assembly 104. The support structure 126 is configured to support the combined weight of the filter assembly 110 and the aquarium bed 908 that is received in the bed-support assembly 104. The width of the support structure 126 may vary as needed.

The opposite end portions of the support structure 126 (also called a band structure) are affixed to the frame work of the bed-support assembly 104. Optionally, the support structure 126 is not affixed to the filter assembly 110. Preferably, the support structure 126 contacts (at least in part) the filter assembly 110.

Figure 10:
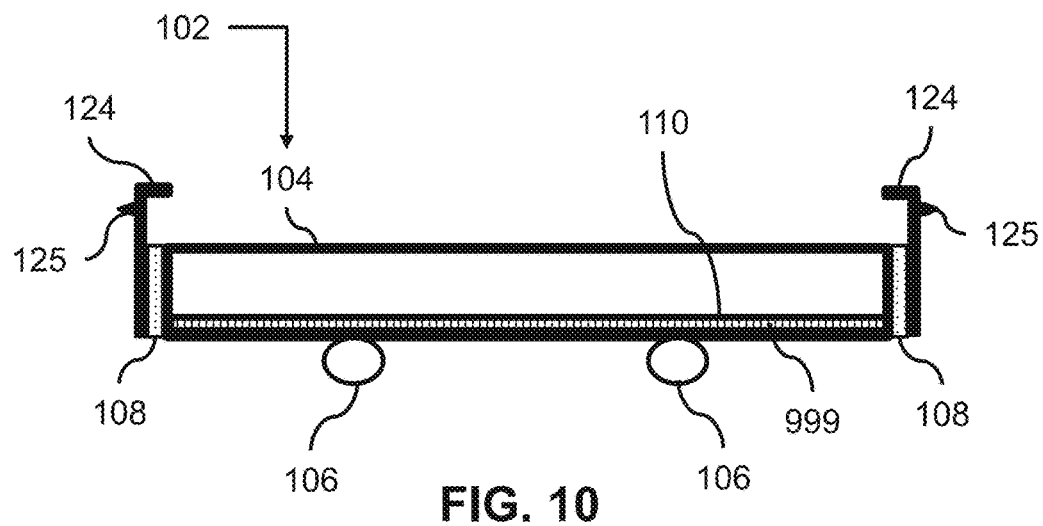
FIG. 10 and FIG. 11 depict cross-sectional views of embodiments of the waste-movement system of FIG. 1.
Figure 11:
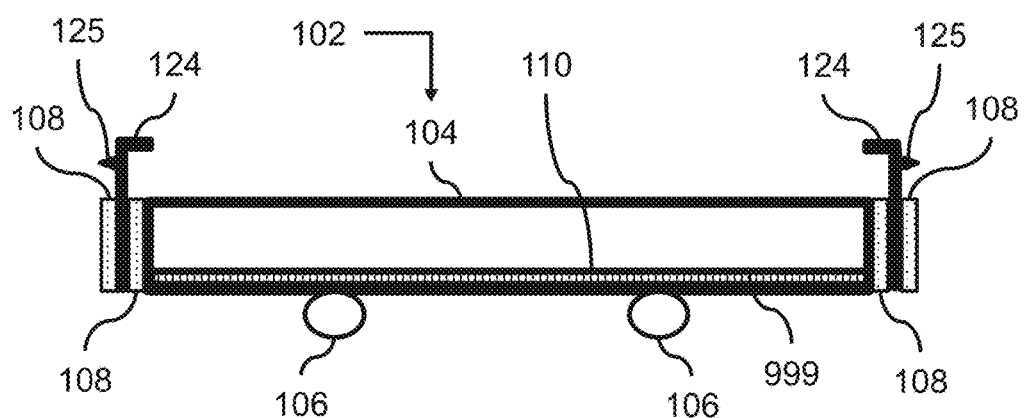

FIG. 10 and FIG. 11 depict cross-sectional views (taken along a cross-sectional line B-B of FIG. 5) of embodiments of the waste-movement system 102 of FIG. 1.

Referring to the embodiment as depicted in FIG. 10, the vibration-damping assembly 108 is positioned between the latch assembly 124 and the bed-support assembly 104. This is done in such a way that the vibration-damping assembly 108 further reduces (at least in part) the transfer of vibrational energy from the bed-support assembly 104 to the latch assembly 124.

Referring to the embodiment as depicted in FIG. 11, the vibration-damping assembly 108 is positioned on opposite sides of the latch assembly 124. This is done in such a way that the vibration-damping assembly 108 further reduces (at least in part) the transfer of vibrational energy from the bed-support assembly 104 to the latch assembly 124 (and then to the base assembly 112 as depicted in FIG. 3).

Figure 12:
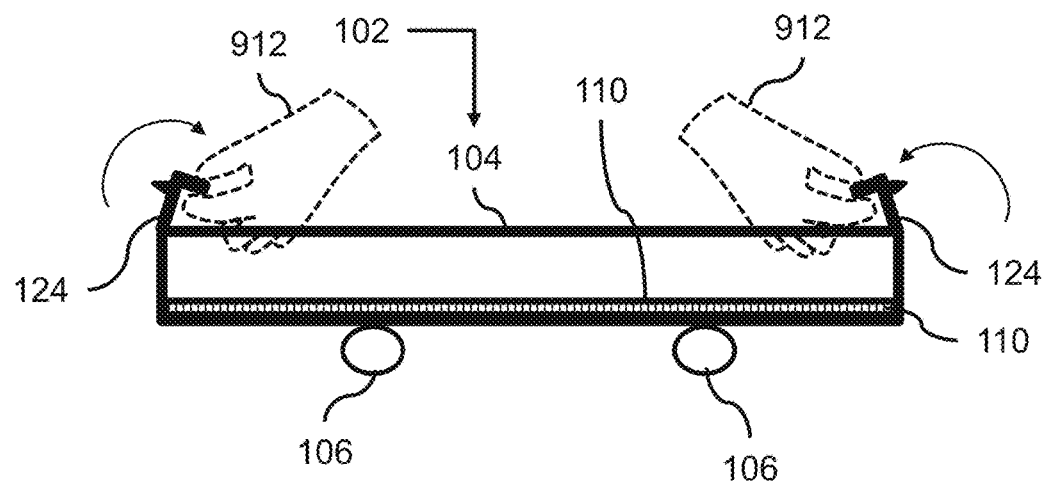
FIG. 12 and FIG. 13 depict cross-sectional views of embodiments of the waste-movement system of FIG. 1.
Figure 13:
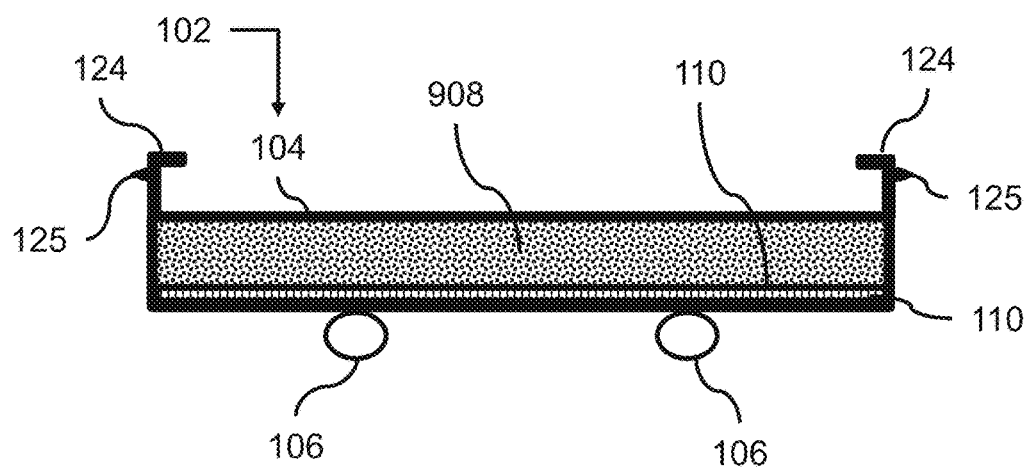

FIG. 12 and FIG. 13 depict cross-sectional views (taken along a cross-sectional line B-B of FIG. 5) of embodiments of the waste-movement system 102 of FIG. 1.

Figure 17:
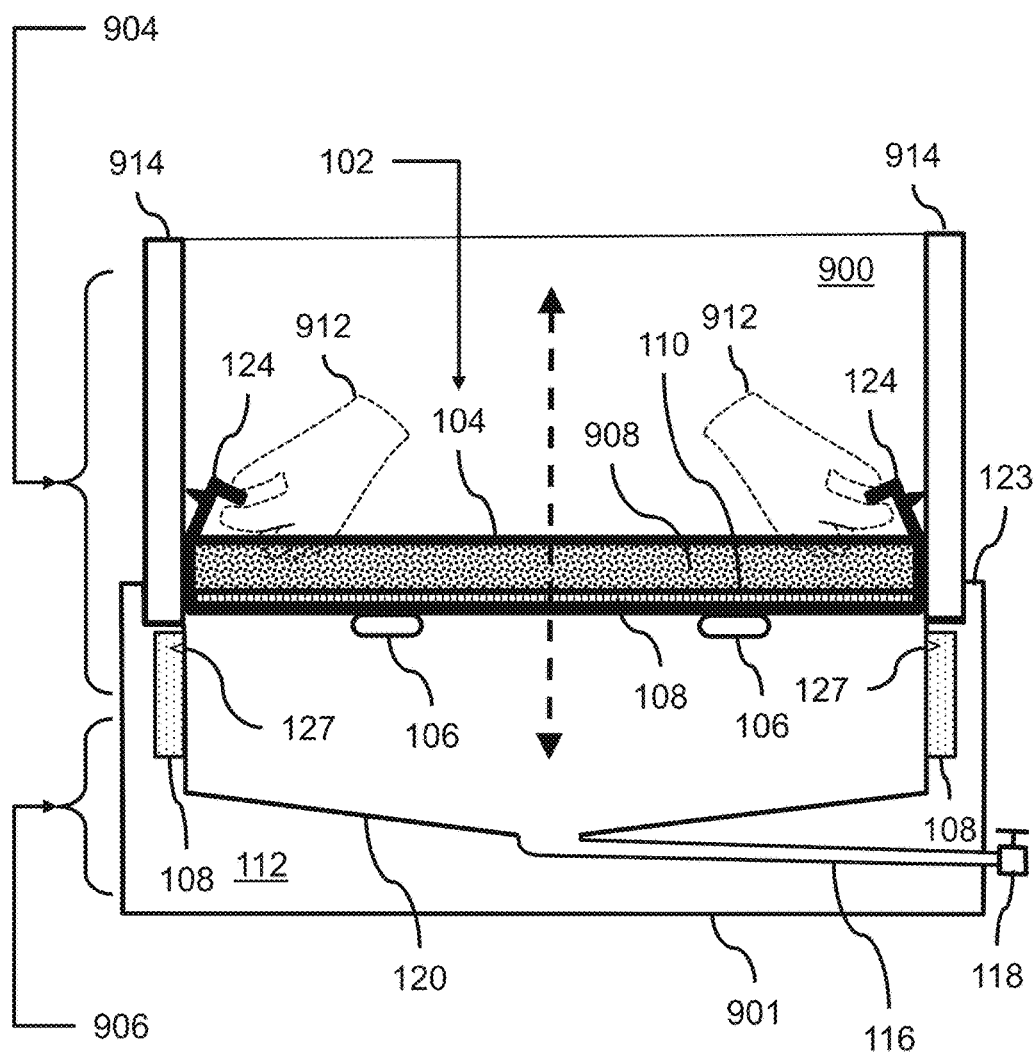
FIG. 17 depicts a cross-sectional view of an embodiment of the waste-movement system of FIG. 1.

In accordance with the embodiments as depicted in FIG. 12 and FIG. 13, the latch assembly 124 is configured to be resiliently coupled to the bed-support assembly 104. This is done in such a way that the user 912 may bend (at least in part) the latch assembly 124 inwardly relative to the interior of the bed-support assembly 104. The bending of the latch assembly 124 facilitates latched connection between the base assembly 112 and the bed-support assembly 104 (as depicted in FIG. 17). The user 912 grabs the latch assembly 124, and pulls (pivots) the latch assembly 124 inwardly. Referring to the embodiment as depicted in FIG. 13, the aquarium bed 908 is installed and received in the bed-support assembly 104.

Figure 14:
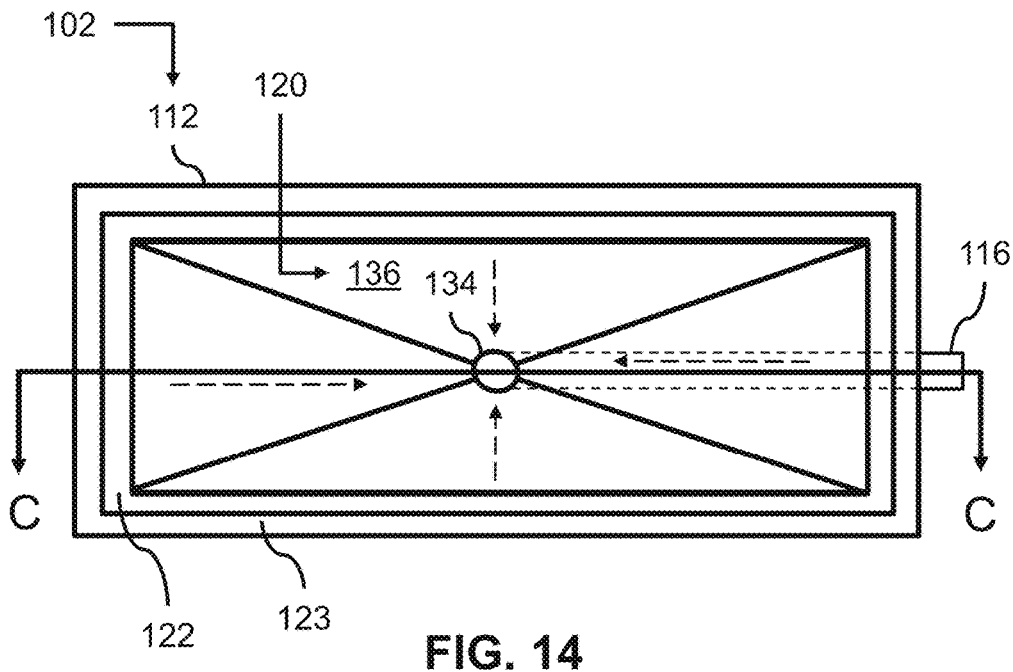
FIG. 14 and FIG. 15 depict a top view (FIG. 14) and a cross-sectional view (FIG. 15) of embodiments of the waste-movement system of FIG. 1.
Figure 15:
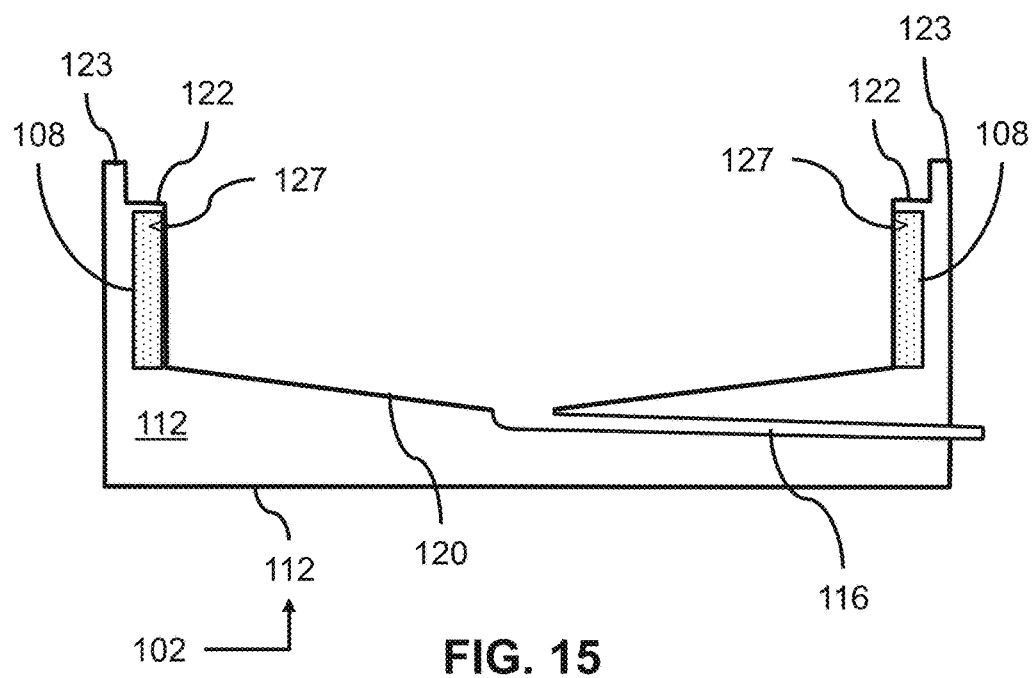

FIG. 14 and FIG. 15 depict a top view (FIG. 14) and a cross-sectional view (FIG. 15, taken along a cross-sectional line C-C of FIG. 14) of embodiments of the waste-movement system 102 of FIG. 1.

In accordance with the embodiments as depicted in FIG. 14 and FIG. 15, the drain assembly 120 forms (provides) sloped floors 136. The sloped floors 136 are configured to slope toward the central zone of the drain assembly 120, and converge at an exit port 134 positioned in the central zone of the drain assembly 120.

The base assembly 112 is configured to provide a raised ledge 122 that is aligned around the outer perimeter that extends upwardly (such as, extends about one inch). The raised ledge 122 is configured to accommodate (receive) and support a thickness of a side wall (glass side wall) of the aquarium 900 (as depicted in FIG. 15). The base assembly 112 is configured to provide a raised perimeter wall 123 that is aligned around the outer perimeter that extends upwardly. The raised perimeter wall 123 is positioned adjacent to the raised ledge 122. The raised perimeter wall 123 is configured to contact the side wall (glass side wall) of the aquarium 900 (as depicted in FIG. 15).

Referring to the embodiment as depicted in FIG. 15, the base assembly 112 provides a latch receiver 127 configured to selectively latch with the latch assembly 124 (as depicted in FIG. 13). Preferably, the latch receiver 127 is configured to selectively latch with the detent device 125 of the latch assembly 124. In accordance with an option, the base assembly 112 supports (provides) the vibration-damping assembly 108 configured to be positioned adjacent to (and make contact with) the bed-support assembly 104 (as depicted in FIG. 3). Preferably, the latch receiver 127 is surrounded by the vibration-damping assembly 108.

Figure 16:
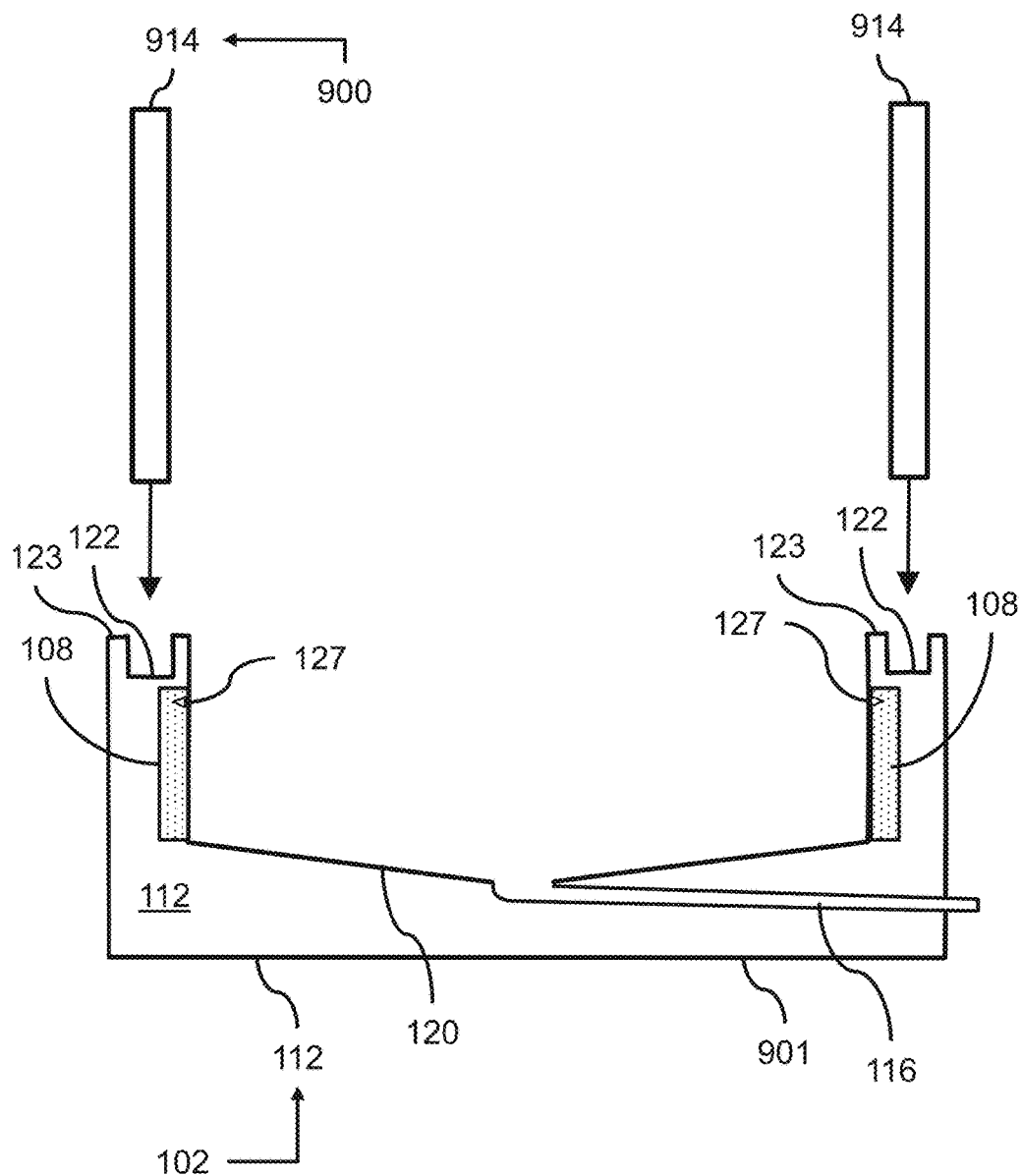
FIG. 16 depicts a cross-sectional view of an embodiment of the waste-movement system of FIG. 1.

FIG. 16 depicts a cross-sectional view (taken along a cross-sectional line A-A of FIG. 1) of an embodiment of the waste-movement system 102 of FIG. 1.

In accordance with the embodiment as depicted in FIG. 16, the base assembly 112 forms (provides) a U-shaped upper section configured to receive at least one or more side walls 914 of the aquarium 900. The base assembly 112 may be molded to form sides (such as, four sides having a height of about four inches). The base assembly 112 is configured to receive, and to seal against, the upstanding side wall (side walls) of the aquarium 900. This is done in such a way that the aquarium water remains contained in the aquarium 900 once the aquarium 900 receives water. The base assembly 112 provides a sloped floor leading to a slot in the base assembly 112, which forms a drain. The drain leads to the exit assembly 116. The exit assembly 116 is located near the bottom of the base assembly 112 (preferably, at the backside of the base assembly 112.

FIG. 17 depicts a cross-sectional view (taken along a cross-sectional line A-A of FIG. 1) of an embodiment of the waste-movement system 102 of FIG. 1.

In accordance with the embodiment as depicted in FIG. 17, the bed-support assembly 104 is configured to be inserted into the interior of the aquarium 900. Preferably, the bed-support assembly 104 is configured to be positioned between the first interior section 904 and the second interior section 906. The user 912 grabs the latch assembly 124, and pulls the latch assembly 124 inwardly. More specifically, the user 912 grabs the latch assembly 124 of the bed-support assembly 104, and moves (installs) the bed-support assembly 104 into position within the aquarium 900. The user 912 bends the latch assembly 124 inwardly relative to the interior of the aquarium 900, and slides the bed-support assembly 104 toward the latch receiver 127. This is done in such a way that the detent device 125 (as depicted in FIG. 13) of the latch assembly 124 lines up with and is inserted into the latch receiver 127 (provided by the base assembly 112). Once the latch receiver 127 and the detent device 125 are aligned with one another, the user 912 releases the latch assembly 124 in such a way that the latch assembly 124 urges the detent device 125 into the latch receiver 127. In this manner, the latch assembly 124 is configured to selectively latch (connect) the bed-support assembly 104 to the base assembly 112.

Figure 18:
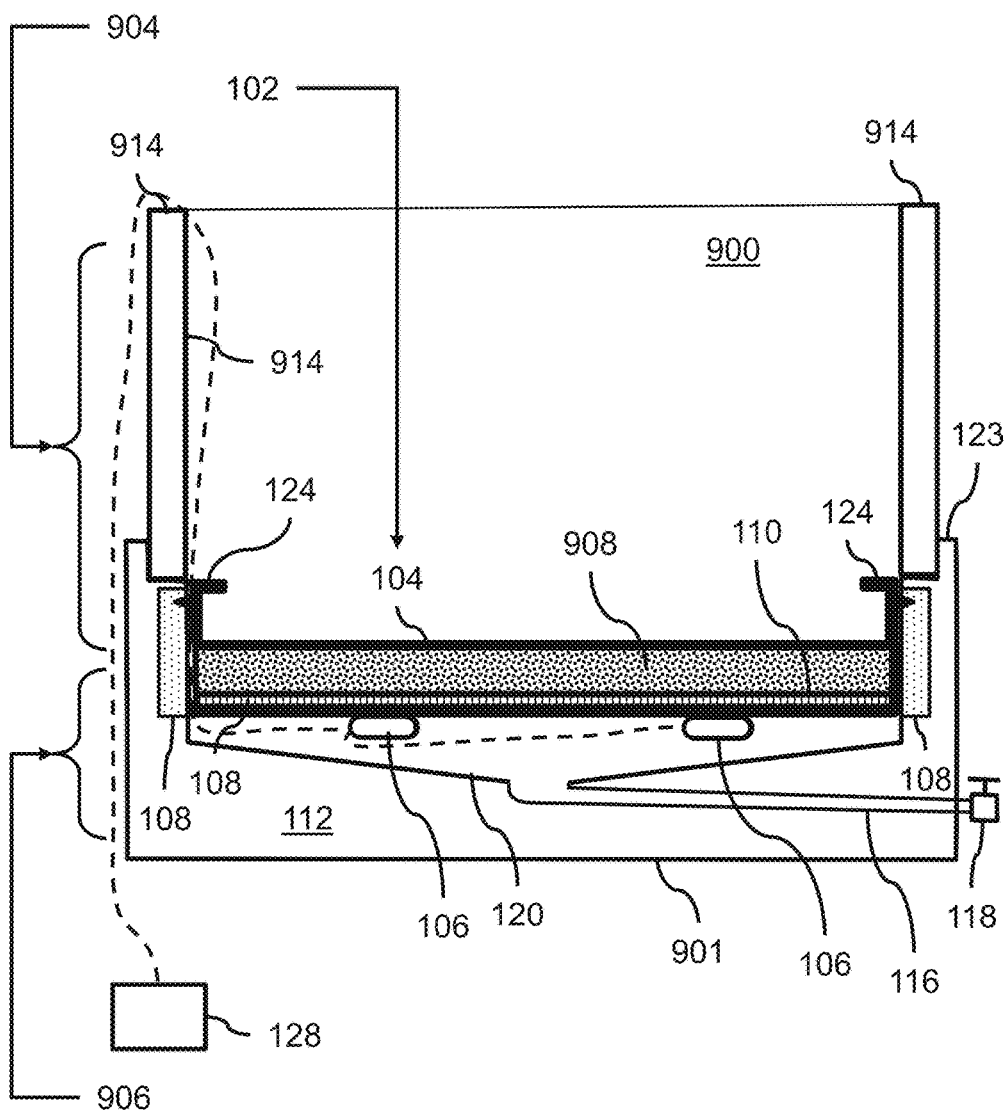
FIG. 18 depicts a cross-sectional view of an embodiment of the waste-movement system of FIG. 1.

FIG. 18 depicts a cross-sectional view (taken along a cross-sectional line A-A of FIG. 1) of an embodiment of the waste-movement system 102 of FIG. 1.

In accordance with the embodiment as depicted in FIG. 18, once the bed-support assembly 104 is installed to the base assembly 112, a waste-receiving space or zone is formed (positioned) underneath the bed-support assembly 104 (between the bottom second of the bed-support assembly 104 and the drain assembly 120 of the base assembly 112). The detent device 125 is received in the latch receiver 127.

Figure 19:
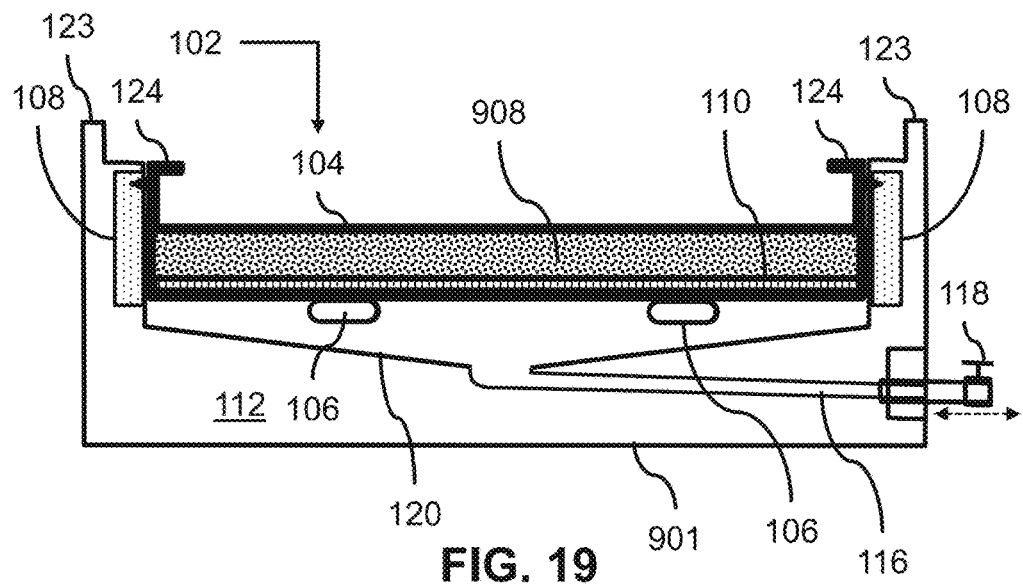
FIG. 19 and FIG. 20 depict cross-sectional views of embodiments of the waste-movement system of FIG. 1.
Figure 20:
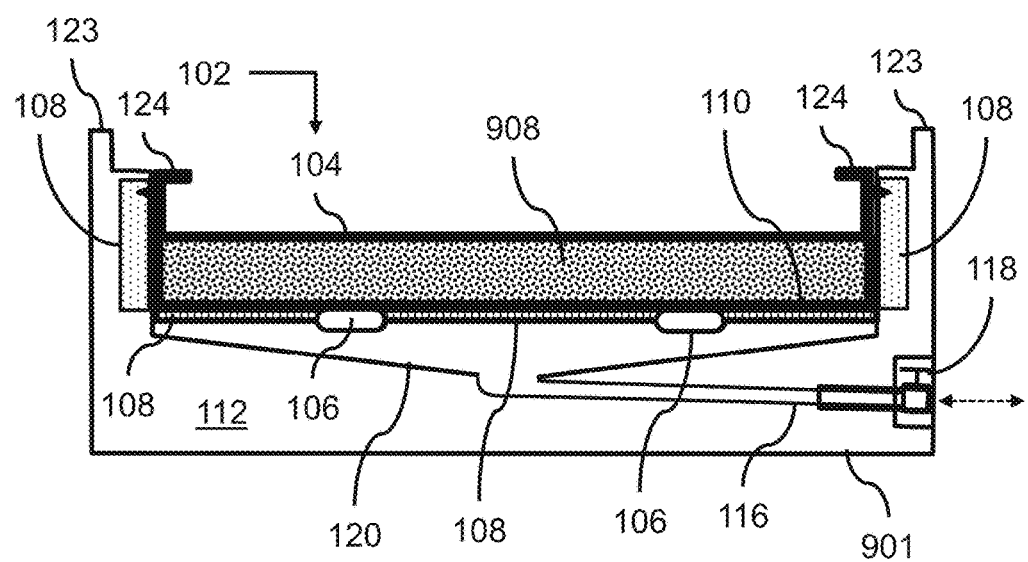

FIG. 19 and FIG. 20 depict cross-sectional views (taken along a cross-sectional line A-A of FIG. 1) of embodiments of the waste-movement system 102 of FIG. 1.

In accordance with the embodiments as depicted in FIG. 19 and FIG. 20, the vibration-source assembly 106 is configured to be selectively retractable between a first position located in the interior of the base assembly 112 (as depicted in FIG. 20), and a second position located in the exterior of the base assembly 112. The exit assembly 116 includes sealing elements configured to maintain the sealing of the exit assembly 116 between the first position and the second position. Preferably, in the first position (also called the retracted position), the valve assembly 118 is positioned in the interior opening formed by or provided by the base assembly 112. Preferably, in the second position (also called the extended position), the valve assembly 118 is positioned in the exterior of the base assembly 112.

FIG. 21 depicts a cross-sectional view (taken along a cross-sectional line A-A of FIG. 1) of an embodiment of the waste-movement system 102 of FIG. 1.

In accordance with the embodiment as depicted in FIG. 21, for the retrofitting of conventional aquariums (in which these types of aquariums are not to be structurally altered), the embodiments associated with FIG. 21 to FIG. 23 are applicable. The apparatus further includes a hopper assembly 130 (also called a waste collector or funnel) configured to be positioned below the bed-support assembly 104. A waste-receiving space (zone) is formed or located under the hopper assembly 130 and above the bottom floor 901 of the aquarium 900.

The drain assembly 120 is formed by (provided by) the hopper assembly 130. The hopper assembly 130 is configured to be inserted into, and removable from, the interior of the aquarium 900. A stand-off assembly 132 is configured to support the hopper assembly 130 over the bottom floor 901 of the aquarium 900.

In accordance with the embodiment associated with FIG. 21, the vibration-source assembly 106 is further configured to be positioned relative to the drain assembly 120. The drain assembly 120 (or the hopper assembly 130) is configured to be inserted into, and removable from, the second interior section 906 of the aquarium 900. The drain assembly 120 extends from the second interior section 906 to the first interior section 904 of the aquarium 900, and also extends to the exterior of the aquarium 900 via the first interior section 904. The drain assembly 120 includes an exit portal 131 positioned in the exterior of the aquarium 900. The drain assembly 120 includes the exit assembly 116, and the exit assembly 116 extends to the exit portal 131. The drain assembly 120 is configured to be positioned relative to the bed-support assembly 104 in such a way that the drain assembly 120 is positioned underneath the bed-support assembly 104.

The vibration-source assembly 106 is further configured to be positioned relative to a pump assembly 114 configured to move the aquarium water, the liquefied waste 903 and the solid waste 902 along a length of the drain assembly 120 (such as along the exit assembly 116). The pump assembly 114 is configured to move the aquarium water, the liquefied waste 903 and the solid waste 902 from the bed-support assembly 104 (while the vibrational energy shakes the aquarium bed 908) to the drain assembly 120. This is done in such a way that the aquarium water, the liquefied waste 903 and the solid waste, in use, flows to the exterior of the aquarium 900 (via the exit assembly 116 and out from the exit portal 131, and preferably into the pail 916).

FIG. 22 and FIG. 23 depict cross-sectional views (taken along a cross-sectional line A-A of FIG. 1) of embodiments of the waste-movement system 102 of FIG. 1.

In accordance with the embodiments as depicted in FIG. 22 and FIG. 23, the pump assembly 114 is positioned in the interior of the hopper assembly 130, at an exit port of the hopper assembly 130. Preferably, the vibration-damping assembly 108 is positioned between the bed-support assembly 104 and the hopper assembly 130 (to further reduce the transfer of vibrational energy from the vibration-source assembly 106 to the hopper assembly 130, and then over to the aquarium 900 as depicted in FIG. 21). The vibration-damping assembly 108 is also attached to the outer peripheral portion of the bed-support assembly 104 in such a way that the vibration-damping assembly 108, in use, reduces the amount of vibrational energy transferred from the bed-support assembly 104 to the aquarium 900 (as depicted in FIG. 21). The exit assembly 116 is connected to the exit port of the hopper assembly 130.

Unless otherwise specified, relational terms used in these specifications should be construed to include certain tolerances that the person skilled in the art would recognize as providing equivalent functionality. By way of example, the term perpendicular is not necessarily limited to 90.0 degrees, but also to any slight variation thereof that the person skilled in the art would recognize as providing equivalent functionality for the purposes described for the relevant member or element. Terms such as "about" and "substantially", in the context of configuration, relate generally to disposition, location, or configuration that is either exact or sufficiently close to the location, disposition, or configuration of the relevant element to preserve operability of the element within the invention which does not materially modify the invention. Similarly, unless specifically made clear from its context, numerical values should be construed to include certain tolerances that the person skilled in the art would recognize as having negligible importance as it does not materially change the operability of the invention. It will be appreciated that the description and/or drawings identify and describe embodiments of the apparatus (either explicitly or non explicitly). The apparatus may include any suitable combination and/or permutation of the technical features as identified in the detailed description, as may be required and/or desired to suit a particular technical purpose and/or technical function. It will be appreciated that, where possible and suitable, any one or more of the technical features of the apparatus may be combined with any other one or more of the technical features of the apparatus (in any combination and/or permutation). It will be appreciated that persons skilled in the art would know that technical features of each embodiment may be deployed (where possible) in other embodiments even if not expressly stated as such above. It will be appreciated that persons skilled in the art would know that other options would be possible for the configuration of the components of the apparatus to adjust to manufacturing requirements and still remain within the scope as described in at least one or more of the claims. This written description provides embodiments, including the best mode, and also enables the person skilled in the art to make and use the embodiments. The patentable scope may be defined by the claims. The written description and/or drawings may help to understand the scope of the claims. It is believed that all the crucial aspects of the disclosed subject matter have been provided in this document. It is understood, for this document, that the phrase "includes" is equivalent to the word "comprising." The foregoing has outlined the non-limiting embodiments (examples). The description is made for particular non-limiting embodiments (examples). It is understood that the non-limiting embodiments are merely illustrative as examples.

What is claimed is:
1. An apparatus, comprising:
  a waste-movement system, including:
    a bed-support assembly being configured to receive, contain and support an aquarium bed of an aquarium; and
    a vibration-source assembly being configured to be positioned relative to the bed-support assembly, and the vibration-source assembly also being configured to selectively generate and transmit vibrational energy to the aquarium bed while aquarium water contained in the aquarium is made to flow in such a way that:
      gravel, contained in the aquarium bed, becomes spaced apart, at least in part, from one another; and
      the aquarium water moves, at least in part, liquefied waste and solid waste through the aquarium bed from a first interior section to a second interior section of the aquarium.

2. An apparatus, comprising:
a waste-movement system, including:
- a bed-support assembly being configured to be inserted into, and removable from, an aquarium, in which the aquarium is configured to contain aquarium water, liquefied waste and solid waste, and the bed-support assembly also being configured to be positioned between a first interior section and a second interior section of the aquarium, and the bed-support assembly also being configured to receive, contain and support an aquarium bed, in which the aquarium bed includes gravel; and
- a vibration-source assembly being configured to be positioned relative to the bed-support assembly containing the aquarium bed, and the vibration-source assembly also being configured to selectively generate and transmit vibrational energy to the aquarium bed while the aquarium water is made to flow from the first interior section to the second interior section of the aquarium in such a way that:
  - the gravel of the aquarium bed becomes, at least in part, spaced apart, at least in part, from one another; and
  - the aquarium water moves, at least in part, the liquefied waste and the solid waste through the aquarium bed from the first interior section to the second interior section of the aquarium.

3. The apparatus of claim 2, wherein
the vibration-source assembly is further configured to be positioned relative to a base assembly configured to form, at least in part, a bottom portion of the aquarium; and
the base assembly is further configured to sealably receive a side wall of the aquarium; and
the base assembly is configured to selectively couple to, and decouple from, the bed-support assembly.

4. The apparatus of claim 3, wherein
the base assembly includes:
- a drain assembly including an exit portal positioned at the bottom portion of the aquarium; and
- the drain assembly being positioned by the base assembly relative to the bed-support assembly in such a way that the drain assembly is positioned underneath the bed-support assembly once the base assembly is selectively coupled to the bed-support assembly; and
- the drain assembly being configured to receive a flow of aquarium water, the solid waste and the liquefied waste from the bed-support assembly once the aquarium water is made to flow from the first interior section to the second interior section of the aquarium while the vibrational energy shakes the aquarium bed; and
- the drain assembly being configured to direct a flow of the aquarium water, the solid waste and the liquefied waste, which was received from the bed-support assembly, to an exterior of the aquarium.

5. The apparatus of claim 2, wherein:
the vibration-source assembly is also configured to selectively stop generation of the vibrational energy in such a way that the vibrational energy is not imparted to, and is not received by, the aquarium bed, and the aquarium bed receives and retains the solid waste, and the solid waste does not move through the aquarium bed from the first interior section to the second interior section of the aquarium.

6. The apparatus of claim 2, wherein:
the bed-support assembly is configured to receive, at least in part, the vibrational energy from the vibration-source assembly, and impart, at least in part, the vibrational energy to the aquarium bed once the bed-support assembly receives the vibrational energy.

7. The apparatus of claim 2, wherein:
the bed-support assembly includes:
- a filter assembly being configured to receive and support the aquarium bed relative to the second interior section of the aquarium, in which the aquarium is configured to receive water and aquatic life therein.

8. The apparatus of claim 7, wherein:
the filter assembly being configured to contain the aquarium bed in the bed-support assembly, and block movement of the aquarium bed away from the bed-support assembly; and
the filter assembly being configured to permit movement of, at least in part, the solid waste away from the bed-support assembly; and
the solid waste, which is vibrating in the bed-support assembly, in use, moves, at least in part, past the aquarium bed, which is vibrating, and moves, at least in part, through the filter assembly and away from the bed-support assembly.

9. The apparatus of claim 2, wherein:
the bed-support assembly is further configured to be positioned relative to a vibration-damping assembly, in which the vibration-damping assembly is configured to dampen, at least in part, the transfer of the vibrational energy from the bed-support assembly to the aquarium.

10. The apparatus of claim 2, wherein:
the bed-support assembly includes a latch assembly; and
the latch assembly is configured to selectively connect the bed-support assembly to a base assembly of the aquarium.

11. The apparatus of claim 2, wherein:
the vibration-source assembly is further configured to be positioned relative to a drain assembly configured to be inserted into, and removable from, the second interior section of the aquarium; and
the drain assembly extends from the second interior section to the first interior section of the aquarium, and also extends to the exterior of the aquarium via the first interior section; and
the drain assembly includes an exit portal positioned in the exterior of the aquarium; and
the drain assembly is configured to be positioned relative to the bed-support assembly in such a way that the drain assembly is positioned underneath the bed-support assembly.

12. The apparatus of claim 11, wherein:
the vibration-source assembly is further configured to be positioned relative to a pump assembly configured to move, at least in part, the aquarium water, the liquefied waste and the solid waste along a length of the drain assembly; and
the pump assembly is configured to move, at least in part, the aquarium water, the liquefied waste and the solid waste from the bed-support assembly, while the vibrational energy, in use, shakes the aquarium bed, to the drain assembly in such a way that aquarium water, the liquefied waste and the solid waste, in use, flows, at least in part, to the exterior of the aquarium.

13. The apparatus of claim 11, wherein
the vibration-source assembly is further configured to be positioned relative to a base assembly configured to form, at least in part, a bottom portion of the aquarium; and
the base assembly is configured to sealably receive a side wall of the aquarium; and
the base assembly is configured to selectively couple to, and decouple from, the bed-support assembly.

14. The apparatus of claim 13, wherein:
the exit portal is positioned at the bottom portion of the aquarium; and
the drain assembly being positioned by the base assembly relative to the bed-support assembly in such a way that the drain assembly is positioned underneath the bed-support assembly once the base assembly is selectively coupled to the bed-support assembly; and
the drain assembly being configured to receive a flow of aquarium water, the solid waste and the liquefied waste from the bed-support assembly once the aquarium water is made to flow from the first interior section to the second interior section of the aquarium while the vibrational energy shakes the aquarium bed; and
the drain assembly being configured to direct a flow of the aquarium water, the solid waste and the liquefied waste, which was received from the bed-support assembly, to an exterior of the aquarium.

15. The apparatus of claim 11, wherein:
the vibration-source assembly is also configured to selectively stop generation of the vibrational energy in such a way that the vibrational energy is not imparted to, and is not received by, the aquarium bed, and the aquarium bed receives and retains the solid waste, and the solid waste does not move through the aquarium bed from the first interior section to the second interior section of the aquarium.

16. The apparatus of claim 11, wherein:
the bed-support assembly is configured to receive, at least in part, the vibrational energy from the vibration-source assembly, and impart, at least in part, the vibrational energy to the aquarium bed once the bed-support assembly receives the vibrational energy.

17. The apparatus of claim 11, wherein:
the bed-support assembly includes:
a filter assembly being configured to receive and support the aquarium bed relative to the second interior section of the aquarium, in which the aquarium is configured to receive water and aquatic life therein.

18. The apparatus of claim 17, wherein:
the filter assembly being configured to contain the aquarium bed in the bed-support assembly, and block movement of the aquarium bed away from the bed-support assembly; and
the filter assembly being configured to permit movement of, at least in part, the solid waste away from the bed-support assembly; and
the solid waste, which is vibrating in the bed-support assembly, in use, moves, at least in part, past the aquarium bed, which is vibrating, and moves, at least in part, through the filter assembly and away from the bed-support assembly.

19. The apparatus of claim 11, wherein:
the bed-support assembly is further configured to be positioned relative to a vibration-damping assembly, in which the vibration-damping assembly is configured to dampen, at least in part, the transfer of the vibrational energy from the bed-support assembly to the aquarium.

* * * * *